(12) United States Patent
Zhang et al.

(10) Patent No.: US 11,731,484 B2
(45) Date of Patent: Aug. 22, 2023

(54) VEHICLE AIR CONDITIONING DEVICE

(71) Applicant: DENSO CORPORATION, Kariya (JP)

(72) Inventors: Lei Zhang, Shanghai (CN); Xiaoya Su, Shanghai (CN); Yunfei Hu, Shanghai (CN); Pingping Xian, Shanghai (CN)

(73) Assignee: DENSO CORPORATION, Kariya (JP)

( * ) Notice: Subject to any disclaimer, the term of this patent is extended or adjusted under 35 U.S.C. 154(b) by 189 days.

(21) Appl. No.: 17/140,161

(22) Filed: Jan. 4, 2021

(65) Prior Publication Data
US 2021/0213799 A1 Jul. 15, 2021

(30) Foreign Application Priority Data

Jan. 9, 2020 (CN) .......................... 202010023066.8

(51) Int. Cl.
*B60H 1/00* (2006.01)
*B60H 1/22* (2006.01)

(52) U.S. Cl.
CPC ..... *B60H 1/00521* (2013.01); *B60H 1/00028* (2013.01); *B60H 1/00207* (2013.01); *B60H 1/00328* (2013.01); *B60H 1/22* (2013.01); *B60H 1/2215* (2013.01); *B60H 2001/00214* (2013.01)

(58) Field of Classification Search
CPC ............ B60H 1/00521; B60H 1/00028; B60H 1/00207; B60H 1/00328; B60H 1/22; B60H 1/2215; B60H 2001/00214; B60H 1/00392; B60H 2001/00078
See application file for complete search history.

(56) References Cited

U.S. PATENT DOCUMENTS

| 4,768,708 A | * | 9/1988 | Klein | ................. B60H 1/00521 237/12.3 A |
| 5,481,885 A | * | 1/1996 | Xavier | ................... B60K 37/00 62/244 |
| 6,044,656 A | * | 4/2000 | Shirota | ................ B60H 1/0005 62/279 |

(Continued)

FOREIGN PATENT DOCUMENTS

| CN | 107000540 A | * | 8/2017 | ............... B60H 1/00 |
| CN | 107199848 A | * | 9/2017 | |

(Continued)

*Primary Examiner* — Ljiljana V. Ciric
(74) *Attorney, Agent, or Firm* — Harness, Dickey & Pierce, P.L.C.

(57) ABSTRACT

A vehicle air conditioning device having a split housing structure includes: a front housing disposed in a compartment of a vehicle; a heat exchanger disposed in the front housing, a rear housing disposed in an engine room or a motor room of the vehicle; a firewall through which the front housing is connected with the rear housing; an inlet; a blower disposed in the rear housing; an evaporator configured to cool air or to chill air; upper and lower mixing doors disposed in an up-and-down direction downstream of the evaporator; a first plate member disposed between the upper and lower mixing doors; a second plate member disposed downstream of the heat exchanger; an upper outlet; and a lower outlet. The first plate member divides the airflow from the evaporator, and the upper and lower mixing doors each guides the airflow to selectively flow through the heat exchanger.

10 Claims, 15 Drawing Sheets

(56) References Cited

U.S. PATENT DOCUMENTS

| | | | | |
|---|---|---|---|---|
| 6,834,709 | B2* | 12/2004 | Shirota | B60H 1/00028 237/12.3 A |
| 7,931,075 | B2* | 4/2011 | Ito | B60H 1/00028 165/122 |
| 9,914,339 | B2* | 3/2018 | Goenka | B60H 1/00028 |
| 9,994,087 | B2* | 6/2018 | Enomoto | B60H 1/22 |
| 10,202,019 | B2* | 2/2019 | Goenka | B60H 1/242 |
| 10,358,016 | B2* | 7/2019 | Omi | B60H 1/00521 |
| 2014/0213168 | A1* | 7/2014 | Goenka | F28F 7/00 165/185 |
| 2021/0323386 | A1* | 10/2021 | Pierres | B60H 1/00535 |

FOREIGN PATENT DOCUMENTS

| | | | | |
|---|---|---|---|---|
| CN | 207059687 | U | 3/2018 | |
| CN | 112477543 | A * | 3/2021 | ......... B60H 1/00028 |
| EP | 0578582 | A1 * | 1/1994 | |
| EP | 0578582 | B1 * | 3/1996 | |
| EP | 0756955 | A2 * | 2/1997 | |
| FR | 3085625 | A1 * | 3/2020 | |
| JP | H06156049 | A * | 8/1995 | |
| JP | 2001080339 | A * | 3/2001 | |
| JP | 2003231410 | A * | 8/2003 | ........... B60H 1/0005 |
| JP | 3521351 | B2 * | 4/2004 | ........... B60H 1/0005 |
| JP | 3694811 | B2 * | 9/2005 | ......... B60H 1/00028 |
| JP | 4432992 | B2 * | 3/2010 | ......... B60H 1/00028 |
| JP | 6052222 | B2 * | 12/2016 | ......... B60H 1/00899 |
| JP | 6287793 | B2 * | 3/2018 | ............... B60H 1/00 |
| WO | WO-2020049250 | A1 * | 3/2020 | ......... B60H 1/00521 |

* cited by examiner

VEHICLE AIR CONDITIONING DEVICE

CROSS REFERENCE TO RELATED APPLICATION

The present application claims the benefit of priority from Chinese Patent Application No. 202010023066.8 filed on Jan. 9, 2020. The entire disclosure of the above application is incorporated herein by reference.

TECHNICAL FIELD

The present disclosure relates to a vehicle air condition device having a split housing structure, that is, a split type vehicle air conditioning device.

BACKGROUND

Usually, entirely or partially engine powered vehicles and pure electric vehicles adopt integral type coolant heating air conditioning devices.

SUMMARY

A vehicle air conditioning device having a split housing structure includes: a front housing disposed in a compartment of a vehicle; a heat exchanger disposed in the front housing, a rear housing disposed in an engine room or a motor room of the vehicle; a firewall through which the front housing is connected with the rear housing; an inlet; a blower disposed in the rear housing; an evaporator configured to cool air or to chill air; upper and lower mixing doors disposed in an up-and-down direction downstream of the evaporator; a first plate member disposed between the upper and lower mixing doors; a second plate member disposed downstream of the heat exchanger; an upper outlet; and a lower outlet. The inlet, the blower, the evaporator, the upper and lower mixing doors, the heat exchanger, and the upper and lower outlets are sequentially arranged from an upstream to a downstream along a direction of an airflow in the vehicle air conditioning device. The first plate member divides the airflow from the evaporator into an upper airflow and a lower airflow. The upper and lower mixing doors each guides and controls the airflow to selectively flow through the heat exchanger. The second plate member guides the airflow downstream of the heat exchanger toward at least one of the upper outlet or the lower outlet.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
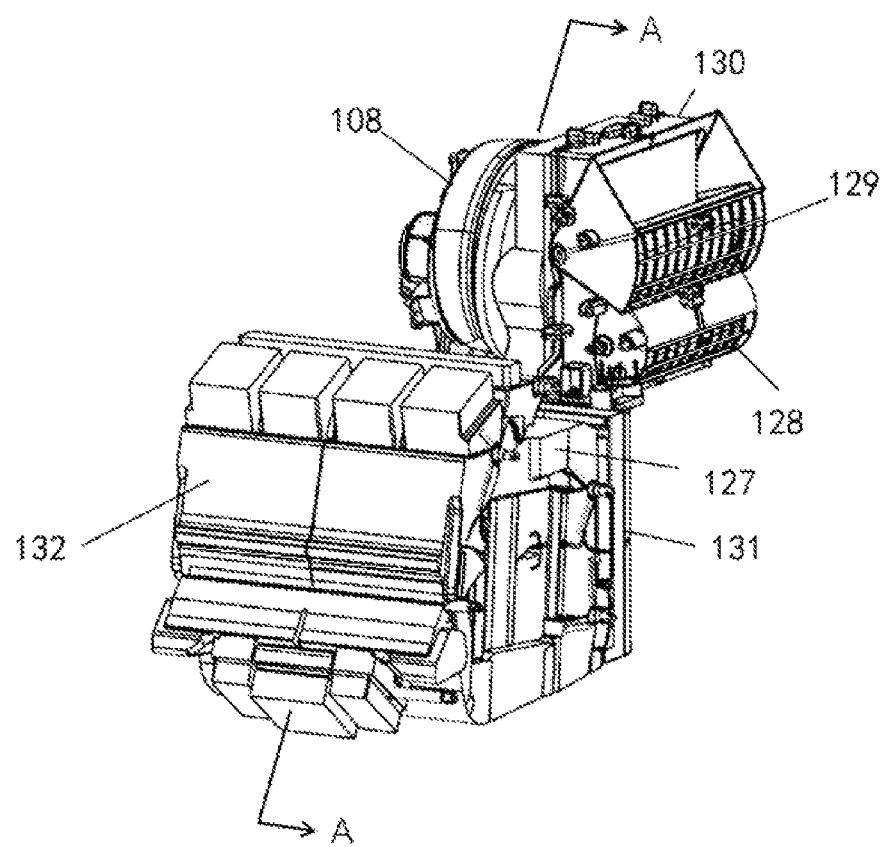
FIG. 1 is a diagram showing a structure of a split type vehicle air conditioning device according to first and second embodiments of the present disclosure.

Currently, all vehicles powered by engines (including fuel vehicles, hybrid vehicles, etc.) and some pure electric vehicles adopt integral type coolant-heating air conditioning devices, and entire parts of the air conditioning device is disposed in the vehicle compartment. Herein, vehicle compartment means a cabin of a vehicle. In the heating mode, coolant is heated after flowing through the engine or a coolant passage of a positive temperature coefficient (PTC) heater, Part of the heated coolant enters the heater core disposed in the housing of the air conditioning device. A blower forces cold air to exchange heat with the heater core. The heated air enters the vehicle compartment through the air supply passage for heating the vehicle compartment. In the cooling mode, a temperature of the airflow decreases after flowing through an evaporator. The airflow does not flow through the heater core by adjusting the air door, and directly enter the vehicle compartment for cooling the vehicle compartment. Since entire parts of the air conditioning device are placed in the vehicle compartment, the vehicle conditioning device occupies a large space in the vehicle compartment, and components generating noises, such as the blower are also positioned in the vehicle compartment.

In order to save inner space of the vehicle compartment, in pure electric vehicles, the air conditioning device is designed to have a split type housing. Hereinafter, the air conditioning device having a split type housing is referred to as a split type vehicle air conditioning device. Specifically, a front housing is disposed in the vehicle compartment, and a rear housing is disposed in a motor room so that the inner space of the vehicle compartment can be saved. More specifically, an internal condenser and the PTC heater are positioned in the front housing which is disposed in the vehicle compartment. The internal evaporator and the blower are positioned in the rear housing which is disposed in the motor room. The front housing is connected with the rear housing through an opening defined in a firewall.

The heat exchange method in the split type air conditioning device of the electric vehicle mentioned above is air-to-air heat exchange, and the heating method is electric heating alone or a combination of electric heating and heat pump. The heat pump generally refers to a vehicle air conditioning (refrigerant) system capable of heating and cooling. The heating method of traditional fuel vehicles is heat exchange between heated coolant and air. Therefore, the above-mentioned split type air conditioning device for electric vehicle cannot be directly applied to a coolant-heated vehicle heating system.

In addition to saving space in the vehicle compartment, with the continuous improvement of requirements for riding comfortableness in the vehicle compartment, the demand for noise reduction in the vehicle compartment is becoming more and more urgent.

In conventional split type air conditioning device for electric vehicle, the internal condenser and the FTC heater are placed together in a cavity of the front housing and disposed in the vehicle compartment. During the operation of the air conditioning device, the refrigerant generates noise when entering the internal condenser, which is known as refrigerant flowing noise. This noise is one of the noise sources in the vehicle compartment. In addition, the internal condenser placed inside the vehicle compartment will cause the connection pipeline to be too long and excessively long pipe may affect tightness of the firewall.

According to an aspect of the present disclosure, a split type vehicle air conditioning device includes: a front housing disposed in a compartment of a vehicle, the front housing including a heat exchanger that heats an airflow flowing through the heat exchanger; a rear housing disposed in an engine room or a motor room of the vehicle; a firewall, the front housing is connected with the rear housing through an opening defined in the firewall; an inlet; a blower disposed in the rear housing and configured to suck air; an evaporator configured to cool air or to chill air, a flow of the air supplied from the blower entirely flowing through the evaporator; upper and lower mixing doors disposed in an up-and-down direction on a downstream side of the evaporator; a first plate member disposed between the upper and lower mixing doors; a second plate member disposed on a downstream side of the heat exchanger; an upper outlet; and a lower outlet. The inlet, the blower, the evaporator, the upper and lower mixing doors, the heat exchanger, and the upper and lower outlets are sequentially arranged from an upstream side to a downstream side along a direction of the airflow in the split type vehicle air conditioning device. The first plate member divides the airflow from the evaporator into an upper airflow and a lower airflow. The upper mixing door guides and controls the upper airflow to selectively flow through the heat exchanger. The lower mixing door guides and controls the lower airflow to selectively flow through the heat exchanger. The second plate member guides the airflow on the downstream side of the heat exchanger toward at least one of the upper outlet or the lower outlet.

According to the above air conditioning device, a space in the engine room or the motor room can be effectively utilized. Since only the front housing is placed in the vehicle compartment, a space occupied by the air conditioning housing in the vehicle compartment can be significantly reduced and an instrument panel can be designed more compactly. Since the space inside the vehicle is enlarged, riding comfortableness of passengers in the vehicle can be improved. In addition, components, such as the blower that may generate noise is placed in the engine room or in the motor room. Thus, the noise in the vehicle compartment can be significantly reduced, and the riding comfortableness and user experience of the vehicle can be improved. In addition, the airflow from the evaporator is divided into the upper airflow and the lower airflow by the first plate member. With combined use of the upper and lower mixing doors, multiple operation modes of the air conditioning device can be switched.

In the present disclosure, the air conditioning device may further include a third plate member disposed between (i) the upper and lower mixing doors and (ii) the heat exchanger. The third plate member is configured to seal a portion between the front housing and the rear housing. The third plate member, together with the first plate member and the second plate member, divides the airflow from the evaporator into the upper airflow and the lower airflow. The evaporator is disposed in the rear housing.

According to the above configuration, the evaporator is placed in the rear housing. Thus, the air conditioning device can further reduce the noise in the vehicle compartment and improve riding comfortableness and user experience in the vehicle compartment.

In the present disclosure, the heat exchanger may be provided by a FTC heater. The split type vehicle air conditioning device may further include an internal condenser disposed in the rear housing and configured to generate heat. The internal condenser may be disposed between the first plate member and the third plate member on a downstream side of the upper and lower mixing doors.

According to the above configuration, the air conditioning device can be applied to an electric vehicle which usually adopts air-to-air (ATA) heat exchange as the heat exchange method. In addition, a refrigerant connection pipe and the heat exchanger that may generate noise are placed outside the vehicle compart. Thus, the flowing sound of refrigerant in the vehicle compartment can be reduced, and a length of the refrigerant connection pipe can be shortened. This configuration can reduce the noise in the vehicle compartment and save the pipe connection cost together with the assembly process of the pipe connection.

In the present disclosure, the heat exchanger may be provided by a heater core in which coolant flows to exchange heat with air.

According to the above configuration, the air conditioning device can be applied to an electric vehicle or a fuel vehicle which usually adopts air-to-water (ATW), that is, air-to-coolant heat exchange as the heat exchange method. The heater core may be installed in the vehicle compartment. During the heating process, the air exchanges heat with the coolant which is heated after cooling the engine. This configuration can make effective use of the waste heat generated in the vehicle and save energy.

The air conditioning device may further include an auxiliary PTC heater disposed on a downstream side of the heater core.

According to the above configuration, immediately after the vehicle is started, it takes a certain time for the temperature of the coolant to rise. At this time, the auxiliary PTC heater can assist rapid heating.

In the present disclosure, the evaporator may be disposed in the front housing and the heat exchanger may be provided by the heater core in which coolant flows to exchange heat.

According to the above configuration, the air conditioning device can also be applied to a water-to-air (ATW), that is, heated coolant-to-air heat exchange method, and can save space in the vehicle compartment and reduce the noise of the blower.

In the above configuration, an auxiliary PTC heater may be disposed on a downstream side of the heater core. With use of the PTC heater, rapid heating can be realized immediately after the vehicle is started.

In the present disclosure, the air conditioning device may further include a double layer flow mode door and a foot door, which are disposed in the front housing and driven by a door shaft to rotate synchronously around the door shaft.

With the above configuration, since the double layer flow mode door and the foot door are driven by a single door shaft, the structure can be simplified by reducing the number of door shaft compared with a case where the double layer flow mode door and the foot door are fixed by respective door shafts. This configuration can save space and manufacturing cost, and can eliminate the need for partition sealing between the double layer flow mode door and the foot door.

In the present disclosure, a center line of the heat exchanger in a horizontal direction may be disposed below the first plate member.

According to the above configuration, a temperature increase of the upper airflow after heat exchange with the heat exchanger is less than a temperature increase of the lower airflow after heat exchange with the heat exchanger. Thus, a temperature of the upper airflow that is blown out is lower than a temperature of the lower airflow that is blown out. Thus, the temperature distribution can be set such that an area around the head of a user has a lower temperature than an area around the feet of the user. This temperature distribution can improve riding comfortableness of the user.

In the present disclosure, a volume of an airflow flowing through an upper portion of the evaporator may be set to be larger than a volume of an airflow flowing through a lower portion of the evaporator.

In the above configuration, in a case where the outside air inlet sucks air on the upper side in the double layer flow mode, a pressure loss generated by the air inlet is relatively large. By setting the volume of the airflow flowing through the upper side to be larger than the volume of the airflow flowing through the lower side, the volume of the upper airflow after flowing through the evaporator can be substantially equal to the volume of the lower airflow after flowing through the evaporator.

Hereinafter, the present disclosure will be described with reference to the accompanying drawings and the embodiments. It is to be understood that the present disclosure is not limited to the drawings and the embodiments.

The present disclosure is made to expand a space in the vehicle compartment, while significantly reducing the noise in the vehicle compartment to improve riding comfortableness and user experience. The present disclosure provides a split type vehicle air conditioning device which includes: a front housing disposed in a compartment of a vehicle, the front housing including a heat exchanger that heats an airflow flowing through the heat exchanger; a rear housing disposed in an engine room or a motor room of the vehicle; a firewall, the front housing is connected with the rear housing through an opening defined in the firewall; an inlet; a blower disposed in the rear housing and configured to suck air; an evaporator configured to cool air or to chill air, a flow of the air supplied from the blower entirely flowing through the evaporator; upper and lower mixing doors disposed in an up-and-down direction on a downstream side of the evaporator; a first plate member disposed between the upper and lower mixing doors; a second plate member disposed on a downstream side of the heat exchanger; an upper outlet; and a lower outlet. The inlet, the blower, the evaporator, the upper and lower mixing doors, the heat exchanger, and the upper and lower outlets are sequentially arranged from an upstream side to a downstream side along a direction of the airflow in the split type vehicle air conditioning device. The first plate member divides the airflow from the evaporator into an upper airflow and a lower airflow. The upper mixing door guides and controls the upper airflow to selectively flow through the heat exchanger, and the lower mixing door guides and controls the lower airflow to selectively flow through the heat exchanger. The second plate member guides the airflow on the downstream side of the heat exchanger toward at least one of the upper outlet or the lower outlet. The upper and lower mixing doors guide and control the upper airflow to selectively flow through the heat exchanger indicates that the upper and lower mixing doors are capable of controlling the airflow to entirely flow through the heat exchanger, or partially flow through the heat exchanger, or entirely not flow through the heat exchanger.

Hereinafter, each embodiment of the split type vehicle air conditioning device of the present disclosure will be described in detail with reference to the accompanying drawings. FIG. 4 to FIG. 8 show the split type vehicle air conditioning device according to the first embodiment of the present disclosure. FIG. 10 to FIG. 13 show the split type vehicle air conditioning device according to the second embodiment of the present disclosure. FIG. 14 to FIG. 17 show the split type vehicle air conditioning device according to the third embodiment of the present disclosure.

FIG. 1 is a diagram showing a structure of the split type vehicle air conditioning device according to the first and second embodiments of the present disclosure. The split type vehicle air conditioning device shown in FIG. 1 is applicable to air-to-air (ATA) heat exchange method, and also applicable to water-to-air (ATW), that is, heated coolant-to-air heat exchange method. Thus, the split type vehicle air conditioning device shown in FIG. 1 is applicable to fuel vehicles, electric vehicles, etc., and can be developed with use of the same platform. As shown in FIG. 1, with a firewall 127 as a reference, a housing of the split type vehicle air conditioning device can be divided into a front housing 132 and a rear housing 131. The front housing 132 is placed in the vehicle compartment, and the rear housing 131 is placed in the engine room or the motor room. The engine room or the motor room is a space in the vehicle for housing an engine or a motor outside of the vehicle compartment.

As also shown in FIG. 1, the split type vehicle air conditioning device includes an inlet. Specifically, the inlet includes an inside air inlet 128 and an outside air inlet 129. A filtering core 130 and a blower 108 are sequentially disposed on downstream side of the inside air inlet 128 and the outside air inlet 129. The split type vehicle air conditioning device further includes a switching door (not shown in the drawings) which can selectively switch an airflow between the inside airflow from the inside air inlet 128 and the outside airflow from the outside air inlet 129. The switching door may also select both of the inside airflow and the outside airflow. The blower 108 provides a power source to the airflow which flows through the housing by sucking air and control a volume of the airflow in the housing of the air conditioning device. Thus, the blower 108 is highly likely to generate noise, With the operation of the blower 108, the air is sucked in the housing from the inside air inlet 128 and/or the outside air inlet 129. Then, the air is filtered by the filtering core 130, and enters the housing of the split type according to the present disclosure.

Figure 2:
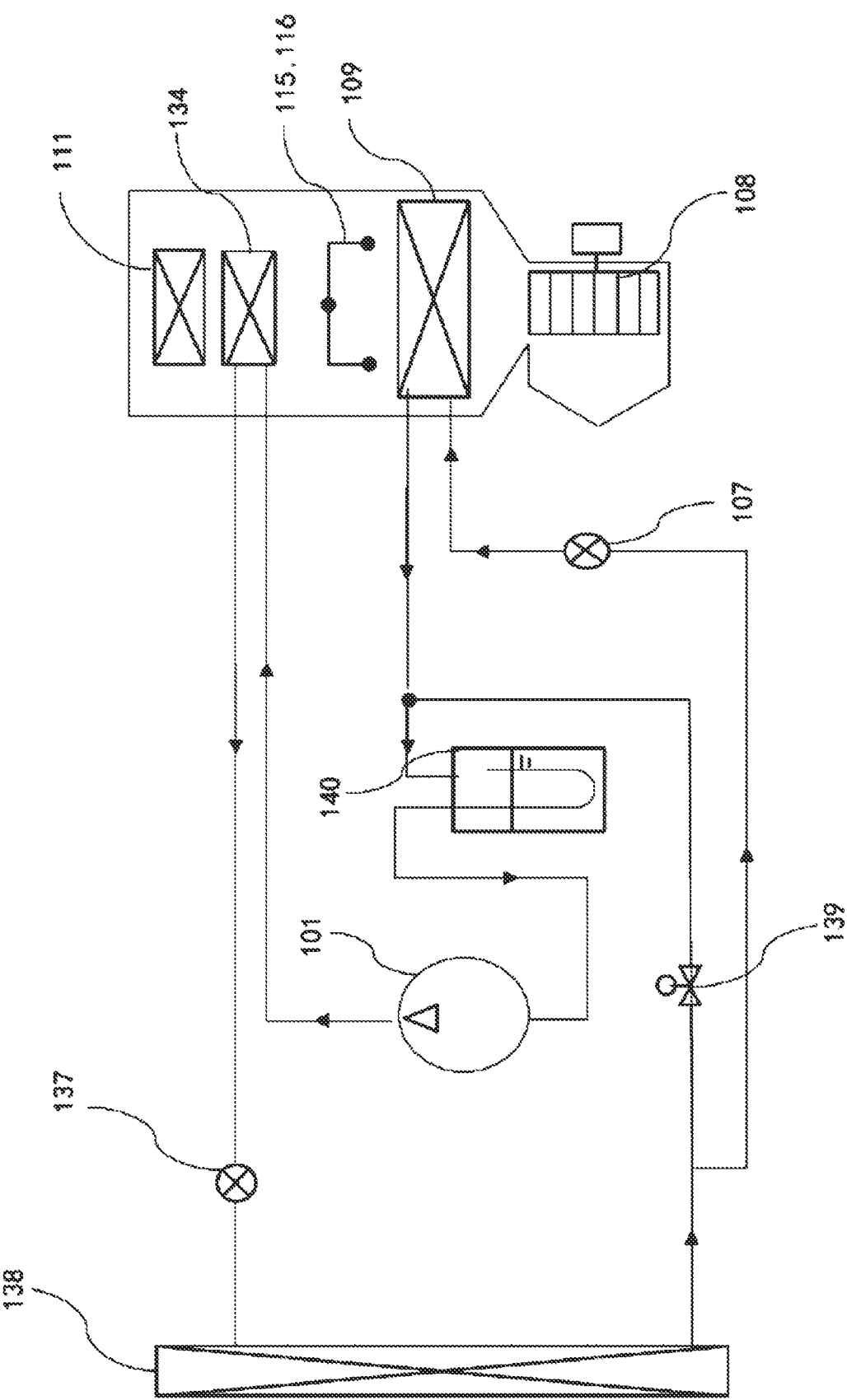
FIG. 2 is a diagram showing a refrigeration system of the split type vehicle air conditioning device according to the first embodiment of the present disclosure.
Figure 3:
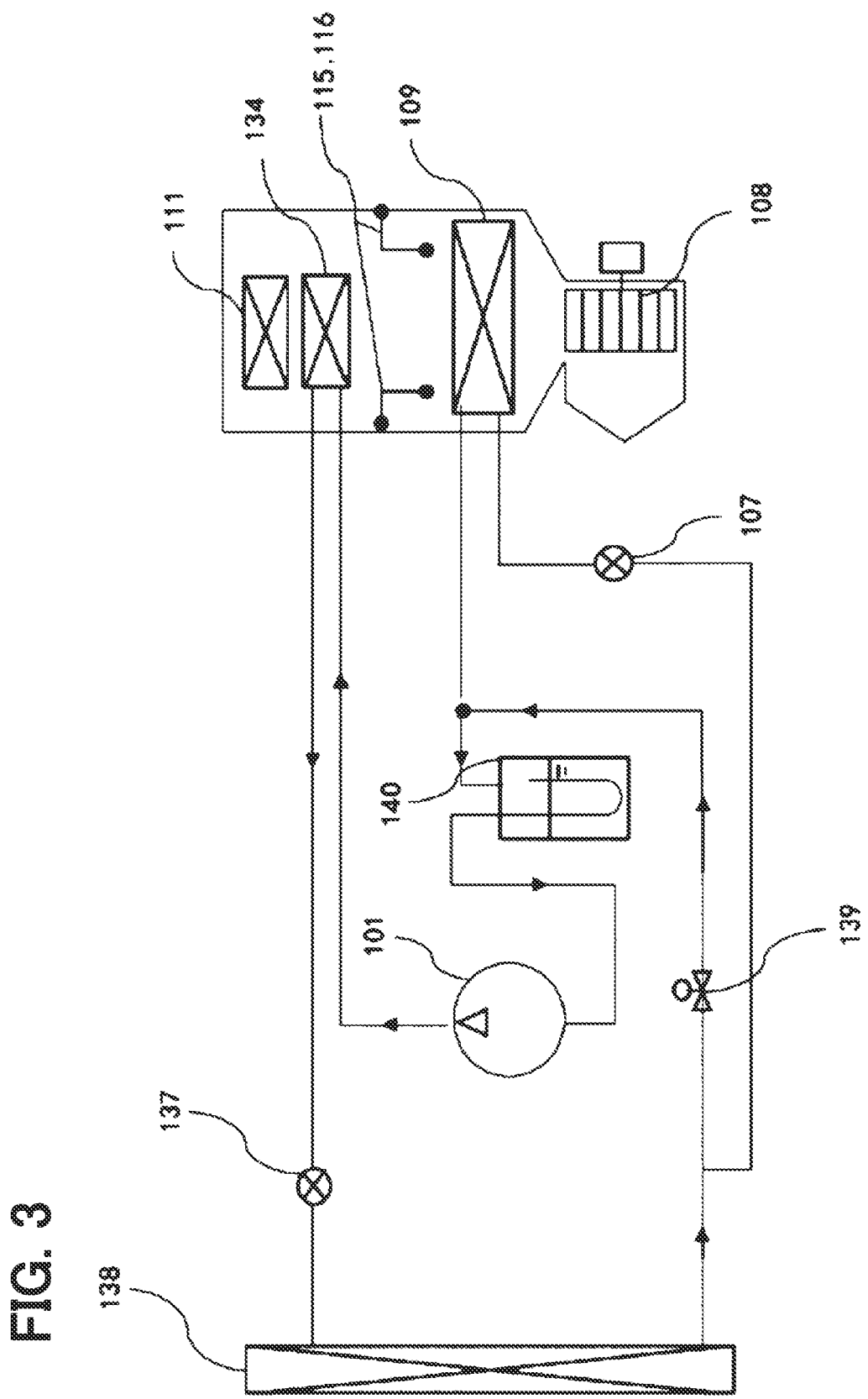
FIG. 3 is a diagram showing a heating system of the split type vehicle air conditioning device according to the first embodiment of the present disclosure.
Figure 4:
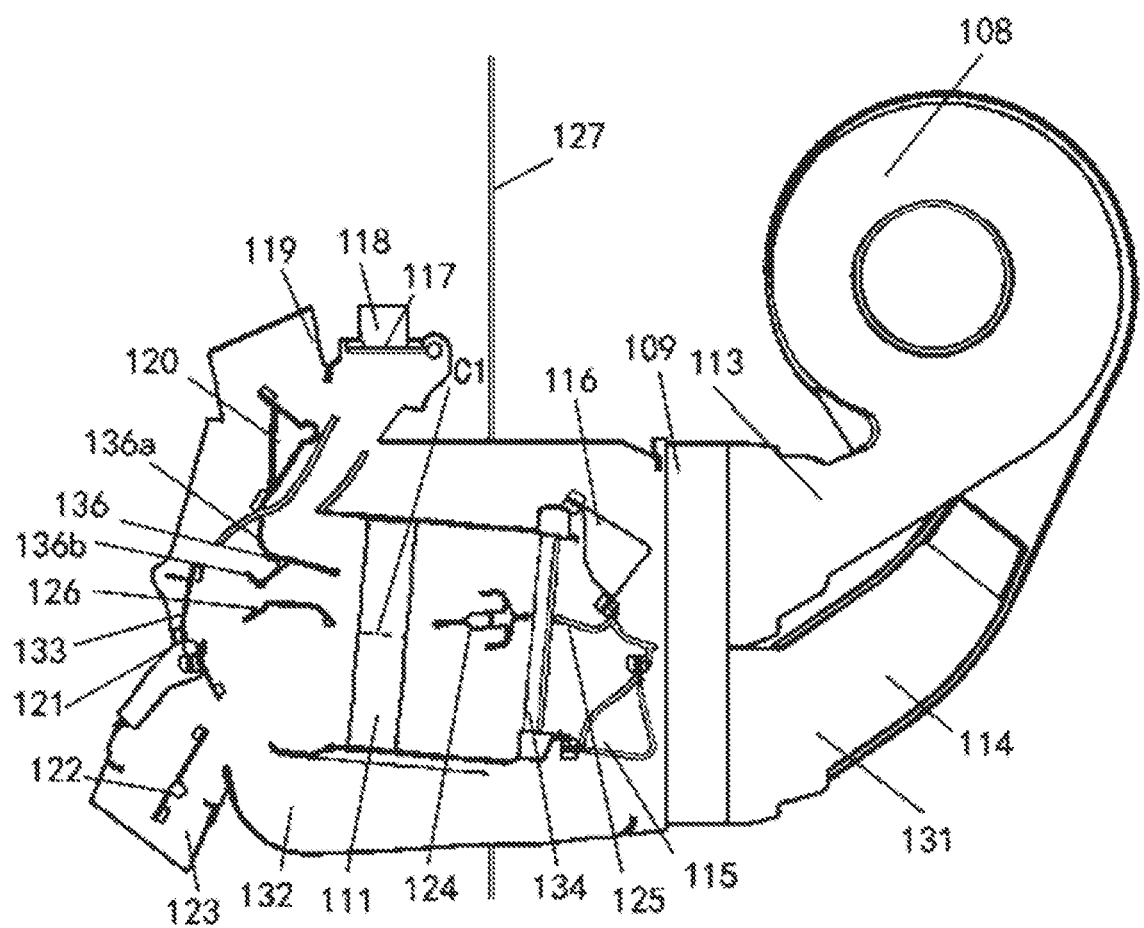
FIG. 4 is a cross-sectional view of the split type vehicle air conditioning device according to the first embodiment of the present disclosure along line A of FIG. 1.
Figure 5:
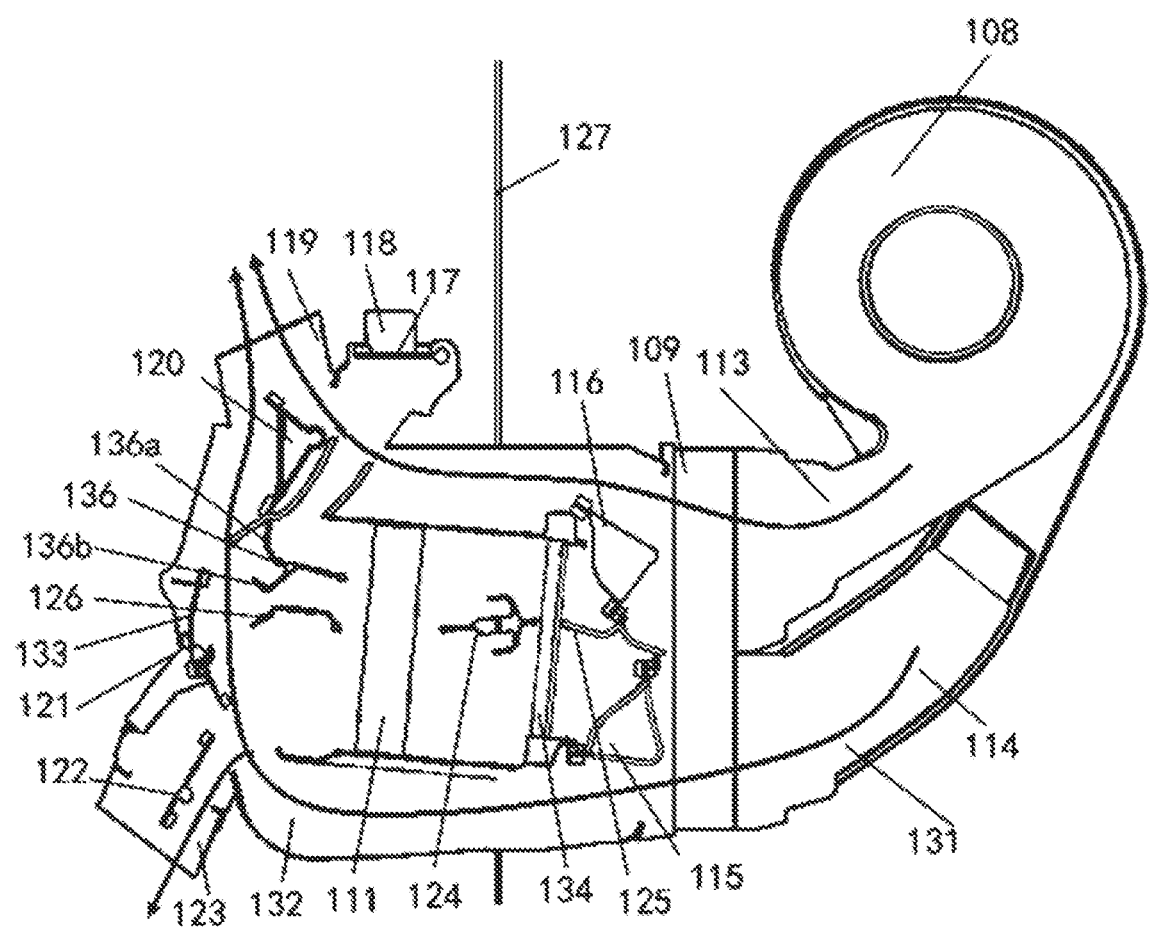
FIG. 5 is a diagram showing an internal airflow in a face blowing mode in the split type vehicle air conditioning device according to the first embodiment.
Figure 6:
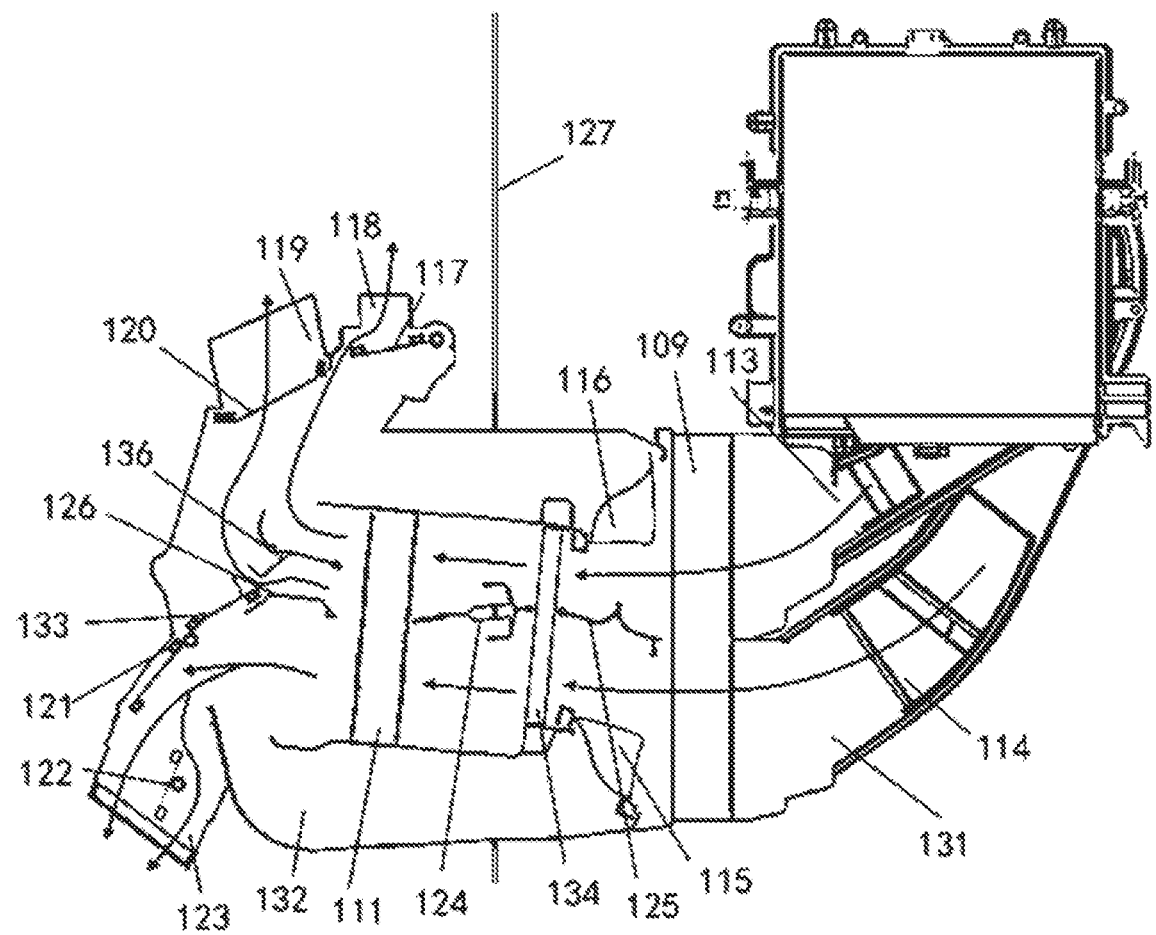
FIG. 6 is a diagram showing an internal airflow in a foot blowing mode in the split type vehicle air conditioning device according to the first embodiment.
Figure 7:
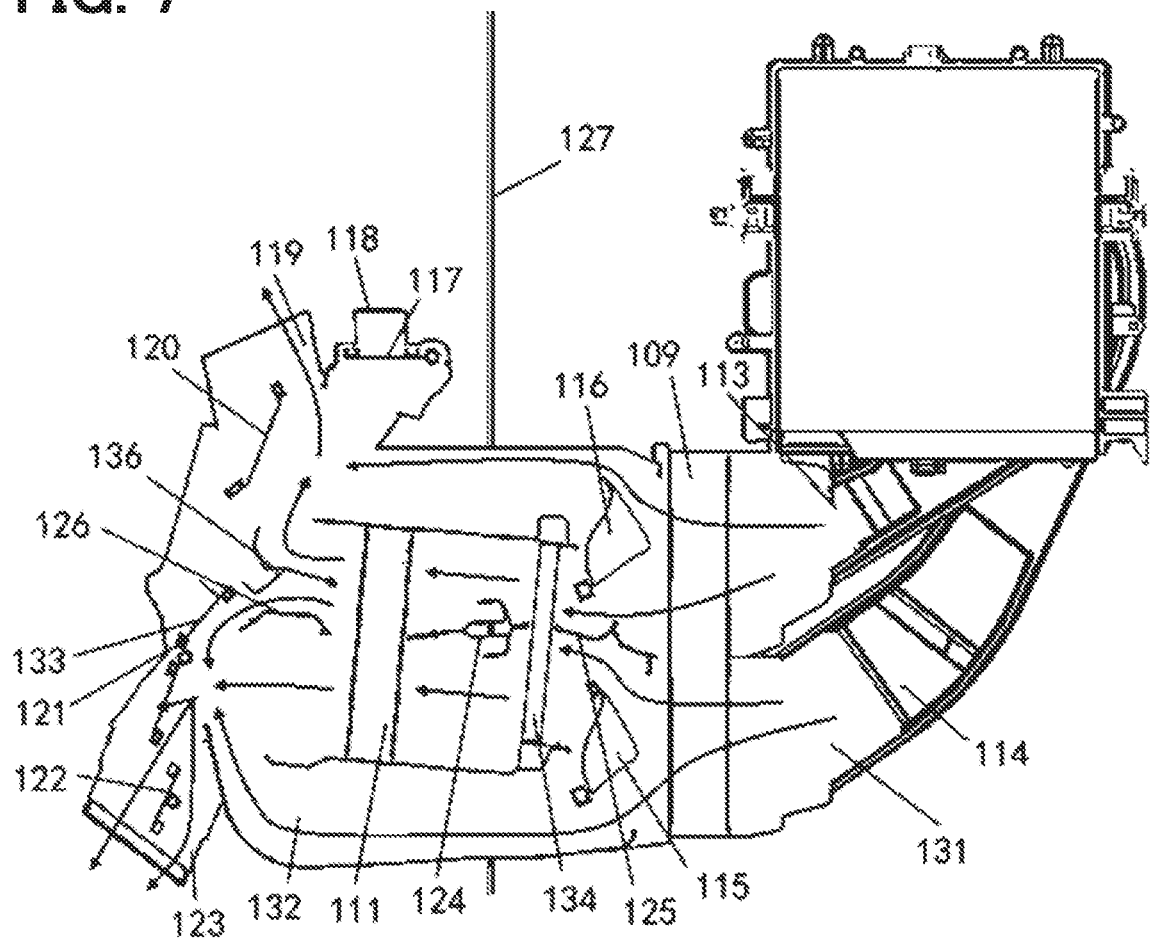
FIG. 7 is a diagram showing an internal airflow in a mixing mode in the split type vehicle air conditioning device according to the first embodiment.

FIG. 4 shows a cross-sectional view of the split type vehicle air conditioning device according to the first embodiment of the present disclosure taken along a line A-A of FIG. 1. FIG. 2 is a diagram showing a cooling system of the split type vehicle air conditioning device according to the first embodiment of the present disclosure, and FIG. 3 is a diagram showing a heating system of the split type vehicle air conditioning device according to the first embodiment of the present disclosure. FIG. 5 to FIG. 7 are diagrams showing internal airflows in different modes in the split type vehicle air conditioning device according to the first embodiment. The split type vehicle air conditioning device of the present embodiment can be applied to an electric vehicle which usually adopts air-to-air (ATA) heat exchange as the heat exchange method.

The following will describe a cooling system circuit and a heating system circuit of the split type vehicle air conditioning device according to the present embodiment. Cooling of the air in the vehicle compartment will be described with reference of FIG. 2. The compressor 101 discharges high temperature and high pressure refrigerant as gas phase, and the gas phase refrigerant flows through an internal condenser 134 and an outside heat exchanger 138 along a refrigerant pipe. In the cooling mode, an expansion valve 137 disposed between the internal condenser 134 and the outside heat exchanger 138 for heating mode use is in completely open state without throttling. The gas phase refrigerant is condensed into liquid phase refrigerant in the outside heat exchanger 138. The two-way solenoid valve 139 disposed on downstream side of the outside heat exchanger 138 is in closed state. The liquid phase refrigerant flows through an expansion valve 107 for cooling mode use along the refrigerant pipe, and is changed to gas-liquid two phase refrigerant having low pressure and low temperature by the throttling of the expansion valve 107. The two-phase refrigerant enters an internal evaporator 109 of the air conditioning device. The two-phase refrigerant exchanges heat with the inside air of the air conditioning device thereby evaporating into gas phase refrigerant, then enters a liquid tank 140, and then is sucked by the compressor 101. This cycle for cooling the air is repeatedly executed in the cooling mode. In the cooling mode, the mixing doors 115, 116 are controlled so that cooled air in the air conditioning device does not flow through the internal condenser 134, and directly enters the vehicle compartment for cooling the air in the vehicle compartment.

Heating of the air in the vehicle compartment will be described with reference of FIG. 3. The mixing doors 115, 116 are controlled to predetermined positions as shown in FIG. 3 so that an air passage from the blower 108 to the internal condenser 134 is open. The compressor 101 discharges high temperature and high pressure refrigerant as gas phase, and the gas phase refrigerant flows through the internal condenser 134 and an outside heat exchanger 138 along a refrigerant pipe. The inside air in the air conditioning device exchanges heat with the internal condenser 134 and is heated, and the heated air is further heated by the PTC heater 111 after flowing through the PTC heater 111 placed on downstream side. Then, the heated air enters the vehicle compartment for heating the air in the vehicle compartment. At the same time, the gas phase refrigerant in the internal condenser 134 is condensed into liquid phase refrigerant. The liquid phase refrigerant flows through the expansion valve 137, and is changed into gas-liquid two phase refrigerant having low pressure and low temperature by the throttling of the expansion valve 137. The two-phase refrigerant enters the outside heat exchanger 138 and evaporates into gas phase refrigerant by exchanging heat. In a case where the system does not require dehumidification, the two-way solenoid valve 139 is in on state, that is closed state, and the gas phase refrigerant enters the liquid tank 140 and is sucked by the compressor 101 again. This cycle is repeated in the heating mode without dehumidification requirement. In a case where the system requires dehumidification, the two-way solenoid valve 139 is in off state, that is in open state, and gas phase refrigerant enters the internal evaporator 109 of the air conditioning device, exchanges heat with the air in the air conditioning device, enters the liquid tank 140, and then is sucked by the compressor 101 again. This cycle is repeated in the heating mode with dehumidification requirement.

As shown in FIG. 4, with the firewall 127 as a reference, the housing of the split type vehicle air conditioning device according to the present embodiment can be divided into the front housing 132 and the rear housing 131. The front housing 132 is arranged in the vehicle compartment, and the rear housing 131 is arranged in the motor room of the vehicle. The front housing 132 is connected with the rear housing 131 through the opening defined in the firewall 127.

The front housing 132 includes a heat exchanger capable of heating the air flowing through the heat exchanger. The heat exchanger is disposed in the front housing 132, In the present embodiment, the heat exchanger may be the FTC heater 111. After the power-on, a temperature of the heating plates of the FTC heater increases and maintains a constant temperature, which can be used to heat air by providing heat.

The rear housing 131 includes the internal condenser 134, the internal evaporator 109, and the blower 108 which are disposed in the rear housing 131. The internal evaporator 109 is used to cool the air, and is a well-known cooling exchanger that configures a part of the refrigeration cycle system. When the refrigerant flows through inside of the internal evaporator 109, the refrigerant absorbs heat from the surrounding air and cools the surrounding air to achieve a cooling effect. The internal condenser 134 is used for heating, and is a heat exchanger that configures a part of the refrigeration cycle system. When the high temperature and high pressure refrigerant gas flows through the inside of the internal condenser 134, the refrigerant discharges heat toward the surrounding air. The discharged heat is used for heating the air in the housing of the air conditioning device. The refrigerant in the internal condenser 134 is condensed into liquid phase refrigerant by discharging heat. Other components such as compressors are disposed outside of the housing of the air conditioning device.

With the above configuration, the space in the motor room can be effectively utilized, and the refrigerant connection pipe and the blower that may generate noise are placed outside the vehicle compart. Thus, the flowing sound of refrigerant in the vehicle compartment can be reduced, and a length of the refrigerant connection pipe can be shortened. This configuration can reduce the noise in the vehicle compartment and save the pipe connection cost together with the assembly process of the pipe connection.

In the housing of the split type vehicle air conditioning device according to the present embodiment, an intake passage of air is formed, and the intake passage extends from the downstream portion of the blower 108 to substantially an entire inside part of the housing (including the front housing and the rear housing) of the air conditioning device.

As shown in FIG. 4, in the rear housing 131, the blower 108, the internal evaporator 109, and the internal condenser 134 are sequentially arranged in described order from upstream to downstream along the flowing direction of intake air. The internal evaporator 109 and the internal condenser 134 are arranged substantially in parallel in the horizontal direction. A height of the internal evaporator 109 is greater than a height of the internal condenser 134. The internal condenser 134 and the PTC heater 111 are arranged approximately corresponding to a center portion of the internal evaporator 109, and the upper and lower ends of the internal evaporator 109 extend beyond the internal condenser 134 and the PTC heater 111 in a vertical direction on a drawing sheet of FIG. 4. The height of the internal evaporator 109 is almost the same as a height of the intake passage in the vertical direction. The air sent from the blower 108 entirely flows through the internal evaporator 109. The internal evaporator 109 is arranged approximately vertically inside the housing of the air conditioning device. This arrangement facilitates the condensed liquid to flow toward a bottom of the evaporator and discharge the liquid. This arrangement prevents the liquid from staying on the fins, which may affect the heat exchange efficiency. This arrangement also prevents the liquid from being blown out of the housing of the air conditioning device under high-speed airflow environment.

As shown in FIG. 4, the front housing 132 further includes an upper outlet and a lower outlet. Specifically, the upper outlet may include a defrost outlet 118 and a face outlet 119. The lower outlet may include a foot outlet (not illustrated since the foot outlet is perpendicular to a surface of the drawing sheet of FIG. 4) and a rear exhaust outlet 123. In the front housing 132, a defrost door 117, a face door 120, a foot door 121, and a rear exhaust door 122 each of which can be controlled to be open and closed may be disposed corresponding to respective outlets. In order to save space and cost, in the front housing 132, a double layer flow mode door 133 may be provided in integrated manner with the foot door 121, which will be described in detail later with reference to FIG. 9.

The airflow sucked by the blower 108 flows through the internal evaporator 109, the internal condenser 134, and the PTC heater 111 sequentially disposed in the intake passage, and then is selectively blown out from the multiple outlets via the above-mentioned doors.

As shown in FIG. 4, in the present embodiment, the blower 108 may adopt a double layer flow mode, that is, the intake passage connected to the blower 108 may be divided into an upper area and a lower area. The upper area may function as an upper intake passage 113, and the lower area may function as a lower intake passage 114. However, the present disclosure is not limited to this configuration. The intake passage connected to the blower 108 may have only a single area without being divided into the upper and lower intake passages. Details of this blower configuration will be described in the single layer mode of the third embodiment. In the present disclosure, under a condition that the airflow from the internal evaporator 109 can be divided into an upper airflow and a lower airflow, the blower 108 may be designed in different manners. Specifically, the airflow from the internal evaporator 109 is divided into the upper airflow and the lower airflow by a first plate member 125, which will be described later.

In the present embodiment, an inside air inlet 128, or an outside air inlet 129, or both of the inside and outside air inlets 128, 129 can be selected by the switching door that can selectively switch the inside and outside air inlets 128, 129. The inside air inlet 128 intakes inside air of the vehicle, and the outside air inlet 129 intakes outside air of the vehicle. The inside air and/or outside air enters the upper intake passage 113 and/or the lower intake passage 114 by controlling the switching door. For example, in the inside air mode, both the upper intake passage 113 and the lower intake passage 114 intake inside air from the inside air inlet 128. In the outside air mode, both the upper intake passage 113 and the lower intake passage 114 intake outside air from the outside air inlet 129. In the double layer flow mode, the upper intake passage 113 intake outside air from the outside air inlet 129, and the lower intake passage 114 intake inside air from the inside air inlet 128. As shown in FIG. 5 to FIG. 7, the two intake passages can be communicated or isolated on downstream of the PTC heater 111. When the upper intake passage 113 is not communicated with the lower intake passage 114, that is, in isolated state, mixing of inside air with outside air can be avoided.

A volume of the airflow flowing through an upper portion of the internal evaporator 109 is set to be larger than a volume of the airflow flowing through a lower portion of the internal evaporator 109. Specifically, in the present embodiment, an area of a cross section of the upper intake passage 113 is set to be slightly larger than an area of a cross section of the lower intake passage 114. This is because the pressure loss generated in the upper intake passage 113 is relatively large when the upper intake passage 113 intakes outside air from the outside air inlet 129 in the double layer flow mode. In order to ensure the air volume of the upper intake passage 113 equal to that of the lower intake passage 114 when entering the internal evaporator 109, the area of cross section of the upper intake passage 113 needs to be set slightly larger than that of the lower intake passage 114.

As shown in FIG. 4, the defrost outlet 118, the face outlet 119, and the corresponding defrost door 117 and the face door 120 are arranged on an upper portion of the housing. The foot outlet and the rear exhaust outlet 123, and the corresponding foot door 121 and the rear exhaust door 122 are arranged on a lower portion of the housing.

In the present embodiment, the upper mixing door 116 and the lower mixing door 115 are arranged on a downstream side of the internal evaporator 109. Specifically, the upper mixing door 116 and the lower mixing door 115 are arranged in an up-and-down direction between the internal evaporator 109 and the internal condenser 134. Thus, the internal condenser 134 is located downstream of the upper mixing door 116 and the lower mixing door 115. The upper mixing door 116 and the lower mixing door 115 are configured to control the airflow to flow through the internal condenser 134 and the PTC heater 111, or block the airflow so that the airflow does not flow through the internal condenser 134 and the PTC heater 111. In the present embodiment, the upper mixing door 116 and the lower mixing door 115 each has a fan shape. The present disclosure is not limited to fan shape, and the mixing doors may have other shapes.

As shown in FIG. 4, the airflow from the internal evaporator 109 is be divided into the upper airflow and the lower airflow by the first plate member 125, which is disposed in the housing of the air conditioning device. The first rib 125 is disposed between the upper mixing door 116 and the lower mixing door 115. The upper mixing door 116 and the lower mixing door 115 respectively guide the upper and lower airflows divided by the first plate member 125 to selectively pass through the PTC heater 111, That is, entire upper and lower airflows or partial upper and lower airflows flow to the PTC heater, or no airflow flows to the FTC heater 111 by blocking the airflow. Details of the airflow controlled and guided by the upper and lower mixing doors 116, 115 will be described in detail with reference to each mode.

A second plate member 126 is disposed on the downstream side of the PTC heater 111, and the second plate member 126 guides the airflow from downstream side of the FTC heater 111 to the aforementioned upper outlet and/or lower outlet.

Further, a third plate member 124 is disposed between (I) the upper and lower mixing doors and (ii) the PTC heater 111. Specifically, in the present embodiment, the third plate member 124 is disposed between the internal condenser 134 and the PTC heater 111, Thus, the internal condenser 134 is located between the first plate member 125 and the third plate member 124. The third plate member 124 is configured to seal a portion between the front housing 132 and the rear housing 131. The third plate member 124 is disposed at a position approximately corresponding to the firewall 127. The third plate member 124, together with the first plate member 125 and the second plate member 126, divides the airflow from the internal evaporator 109 into the upper airflow and the lower airflow.

Figure 8:
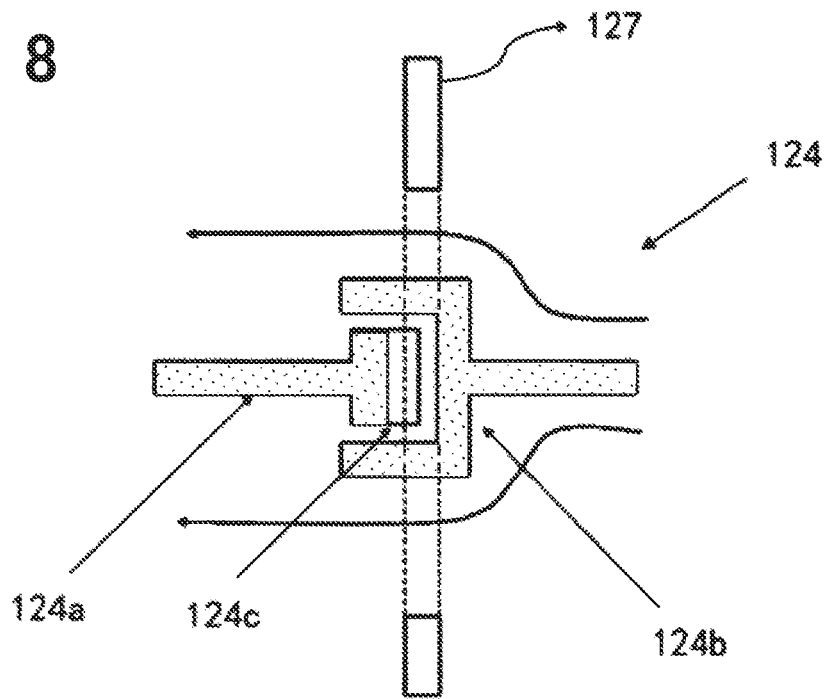
FIG. 8 is a diagram showing a third plate member of the split type vehicle air conditioning device shown in FIG. 4.

The third plate member 124 has a sealing structure and connects outside portion of the housing of the air conditioning device and the inside portion of the housing of the air conditioning device. The third plate member 124 has a structure shown in FIG. 8, and is provided by a left and right fitting structure. In the present embodiment, as shown in FIG. 8, the third plate member 124 includes an inside component member 124a on left side, an outside component member 124b on right side, and a sealing member 124c disposed therebetween. The inside component member 124a is fitted into the outside component member 124b, and a sealing member 124c is disposed at a fitting position of the inside component member 124a and the outside component member 124b, The sealing member 124c disposed at the fitting position can be provided by a foam sealing, and a compression direction of the foam sealing is opposite to the airflow direction to ensure tight sealing. The outside component member 124b may be inclined, Specifically, the outside component member 124b may be inclined at a certain angle relative to the vertical direction in FIG. 8 to decrease flowing resistance of the airflow. The inclination angle may be set to a range of 5 degrees to 10 degrees. In the present embodiment, the inclination angel is set to be 5 degrees.

The first plate member 125 is distanced from a surface of the internal evaporator 109 by a predetermined distance. In the present embodiment, when the upper intake passage 113 has an air intake ratio different from that of the lower intake passage 114, the air volume may be adjusted to ensure that the upper intake passage 113 has the same air intake ratio with that of the lower intake passage 114 so that the upper and lower intake passages 113, 114 have the same air volume. Specifically, when the volume of inside air is same with the volume of the outside air, the first plate member 125 only functions as a partition. In a case where the volume in one of the upper or lower intake passages 113, 114 is greater than the other, due to the pressure difference, partial air will flow through a gap between the first plate member 125 and the internal evaporator 109 to the other intake passage. As a result, the volume of the upper intake passages 113 becomes equal to the volume of the lower intake passage 114 finally.

As shown in FIG. 4, an air guide rib 136 may be disposed above the second plate member 126. The air guide rib 136 includes a first guiding part 136a extending in a direction toward the defrost outlet 118 and a second guiding part 136b extending in a direction toward the face outlet 119. The second plate member 126 has different functions in different modes, as shown in FIG. 5 to FIG. 7 and FIG. 9. In a non-heating mode, the second plate member 126 guides the air flow to improve a uniformity of temperature at the air outlets. Specifically, the second plate member 126 guides the airflow toward the defrost outlet 118 and the face outlet 119 disposed on the upper portion of the housing. In the heating mode, the second plate member 126 cooperates with the double layer flow mode door 133. Specifically, the second plate member 126 is connected with the double layer flow mode door 133 to isolate the upper intake passage 113 from the lower intake passage 114. With this configuration, the double layer flow mode can be provided by isolating the inside air passage from the outside air passage, and inside air in the lower intake passage 114 can be blown to the foot outlet and the rear exhaust outlet 122 which are disposed lower portion of the housing.

Figure 9A:
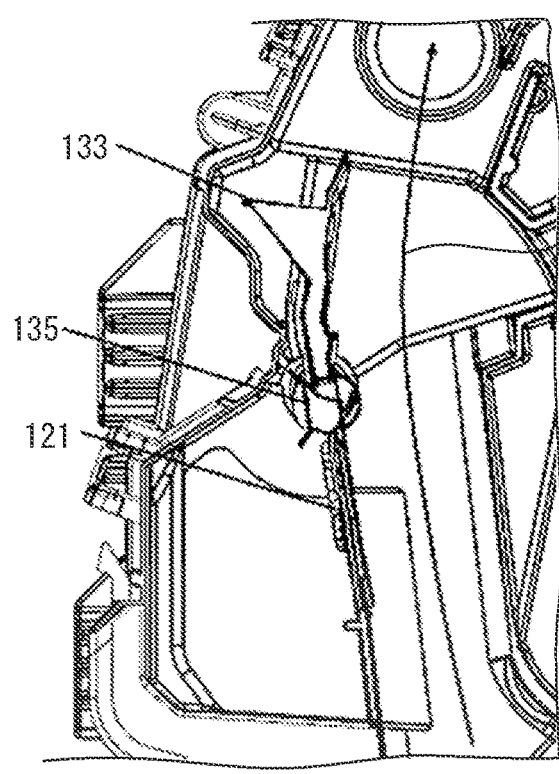
FIG. 9A is a diagram showing a state of a double layer flow mode door in the split type vehicle air conditioning device shown in FIG. 3 in the face blowing mode.
Figure 9B:
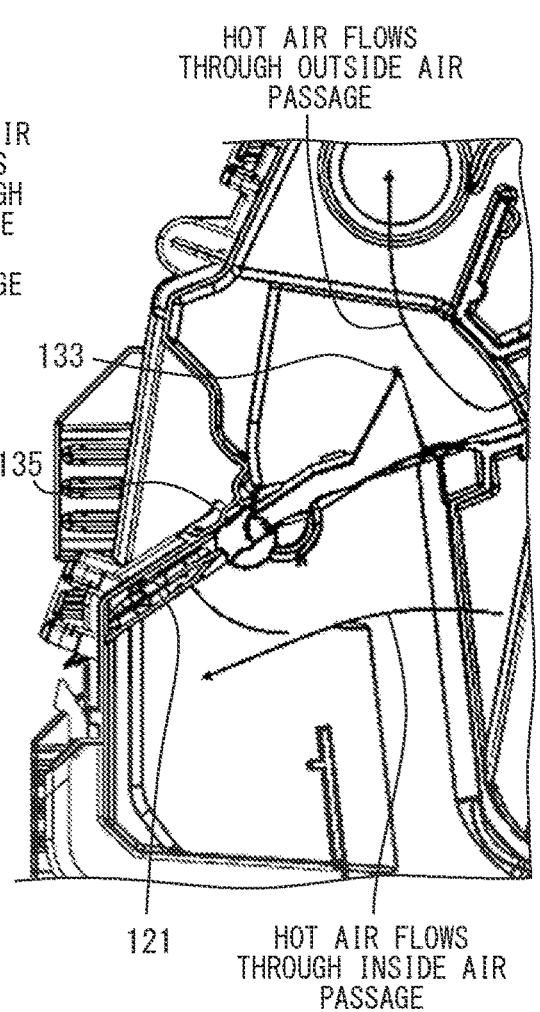
FIG. 9B is a diagram showing a state of a double layer flow mode door in the split type vehicle air conditioning device shown in FIG. 3 in the foot blowing mode.

As described above, the double layer flow mode door 133 may be integrated with the foot door 121. Specifically, the double layer flow mode door 133 and the foot door 121 may be driven by a single door shaft 135 as shown in FIG. 9. Thus, the structure can be simplified by reducing the number of door shaft compared with a case where the double layer flow mode door 133 and the foot door 121 are fixed by respective door shafts. This configuration can save space and manufacturing cost, and can eliminate the need for partition sealing between the double layer flow mode door and the foot door. As shown in FIG. 9A, in a face blowing mode, the double layer flow is disabled. Thus, the double layer flow mode door 133 does not work, and the foot door 121 blocks the foot outlet. The airflow in the lower intake passage 114 does not flow toward the foot outlet as shown by an arrow in FIG. 9A. As shown in FIG. 9B, in a foot blowing mode, the double layer flow is enabled. Thus, the double layer flow mode door 133 isolates the inside air passage from the outside air passage. The foot door 121 is open in the foot blowing mode. The air flow in the upper intake passage 113 and the airflow in the lower intake passage 114 separately flow toward different outlets as shown by arrows in FIG. 9B.

For example, as shown in FIG. 4 and FIG. 5, the airflow entering the housing of the air conditioning device driven by the blower 108 exchanges heat with the internal evaporator 109, and the temperature and humidity of the airflow are decreased. The upper mixing door 116 and the lower mixing door 115 block the airflow from flowing toward internal condenser 134 and the FTC heater 111. The airflow flows through the upper and lower portions of the internal evaporator 109, and then blown out from the face outlet 119 and the rear exhaust outlet 123 thereby entering the vehicle compartment.

In the present embodiment, only the front housing 132 is placed in the vehicle compartment. Compared with the currently used housing of air conditioning device which is entirely placed in the vehicle compartment, the split type vehicle air conditioning device greatly reduces the size of the housing of air conditioning device placed in the vehicle compartment. As a result, the space occupied by the housing of the air conditioning device is reduced, and accordingly, the design of the instrument panel can be made more compact and expand the space in the vehicle compartment. The internal condenser 134, the internal evaporator 109, and the blower 108 are placed in the motor room, which greatly reduces the refrigerant flowing noise and air supply noise in the vehicle compartment, thereby improving riding comfortableness and user experience in the vehicle compartment.

In order to further improve the riding comfortableness for the passenger in the vehicle compartment, the air blown out from the face outlet 119 is controlled to be cooler than the air blown out from the foot outlet in the cooling mode, and the air blown out from the foot outlet is warmer than the air blown out from the face outlet 119 in the heating mode. The volume of airflow flowing through the PTC heater 111 and the internal condenser 134 can be controlled by the plate members 124 and 126 provided inside the split type vehicle air conditioning device. Specifically, in the present embodiment, the plate members 124, 126 are arranged slightly above a center portion of the PTC heater 111 and the internal condenser 134 in the up-and-down direction. The first plate member 125 divides the airflow from the internal evaporator 109 into two airflows. The third and second plate members 124 and 126 guide the two airflows so that cold upper airflow absorbs less heat from the PTC heater 111 and the internal condenser 134 compared with the cold lower airflow. Thus, a temperature of the airflow blown out from the face outlet 119 is lower than a temperature of the airflow blown out from the foot outlet. This configuration enables an area around the head of the user has a lower temperature than an area around the feet of the user. Thus, the user experience and riding comfortableness can be improved.

In the present embodiment, a vertical centerline of the heat exchanger, that is, the FTC heater 111 is inclined at a certain angle with respect to the firewall 127. The vertical centerline of the PTC heater 111 is a center line that is perpendicular to a thickness direction of the PTC heater 111. The above-mentioned inclination angle may be set within a range of 5 degrees to 10 degrees. In the present embodiment, the inclination angle is set to 5 degrees as an example. With this configuration, the airflow flowing through the FTC heater 111 is inclined at a certain angle and flows out from the face outlet 119 and the foot outlet. Thus, the airflow can flow more smoothly, and the pressure loss of the airflow can be minimized thereby improving air supply efficiency.

The FTC heater 111 is arranged such that a centerline of the FTC heater 111 in the horizontal direction is located below the first plate member 125. The centerline of the PTC heater 111 in the horizontal direction refers to the centerline of the PTC heater 111 in a direction parallel to the thickness direction of the PTC heater 111, and is indicated as C1 in FIG. 4. With this configuration, a temperature increase of the upper airflow after heat exchange with the FTC heater 111 is less than a temperature increase of the lower airflow after heat exchange with the PTC heater 111. Thus, a temperature of the upper airflow blown out from the face outlet 119 is lower than a temperature of the lower airflow blown out from the foot outlet. Thus, the temperature distribution can be set such that the area around the head of the user has the lower temperature than the area around the feet of the user. This temperature distribution can improve riding comfortableness of the user.

The following will describe the airflow in the housing of the split type vehicle air conditioning device according to the present embodiment in the face blowing mode, in the foot blowing mode, and in the mixing mode of the face blowing mode and foot blowing mode with reference to FIG. 5 to FIG. 7. An air conditioning controller of the air conditioning device receives instructions from the user to control the operations of each door, the blower, the heater core and other components in order to switch multiple blowing modes.

The following will describe face blowing mode (cooling mode in summer). FIG. 5 is a diagram showing an internal airflow in the face blowing mode in the split type vehicle air conditioning device according to the present embodiment. In the face blowing mode, the face door 120 and the rear exhaust door 122 are completely opened, and the defrost door 117 and the foot door 121 are closed. Driven by the blower 108, the airflow sucked by the inside air inlet 128 flows into the housing of air conditioning device through the upper intake passage 113 and the lower intake passage 114, and flows through the internal evaporator 109 for heat exchange. After the heat exchange, the temperature and humidity of the airflow are decreased. The upper mixing door 116 and the lower mixing door 115 rotate to the predetermined positions as shown in FIG. 5 to prevent airflow from flowing toward the internal condenser 134 and the FTC heater 111. In this mode, the double layer flow mode door 133 is not connected to the second plate member 126. According to the airflow directions indicated by the arrows shown in FIG. 5, the airflow can only flow through the upper and lower portions of the internal evaporator 109, and the cold air is blown out from the face outlet 119 and the rear exhaust outlet 123 into the vehicle compartment for cooling. Specifically, the airflow flowing through the upper portion of the internal evaporator 109 is blown out from the face outlet 119. A part of the airflow flowing through the lower portion of the internal evaporator 109 is blown out from the rear exhaust outlet 123. Another prat of the airflow flowing through the lower portion of the internal evaporator 109 flows through a passage between the double layer flow mode door 133 and the second plate member 126, and is blown out from the face outlet 119.

The following will describe foot blowing mode (heating mode in winter). FIG. 6 is a diagram showing an internal airflow in the foot blowing mode in the split type vehicle air conditioning device according to the present embodiment. In the foot blowing mode, the foot door 121 is completely opened, the defrost door 117 is partially opened, and the face door 120 and the rear exhaust door 122 are closed. Driven by the blower 108, the airflows sucked by the outside air inlet 129 and the inside air inlet 128 flow into the housing of air conditioning device through the upper intake passage 113 and the lower intake passage 114, respectively. The upper mixing door 116 and the lower mixing door 115 rotate to the predetermined positions as shown in FIG. 6 to open the air passage from the internal evaporator 109 to the internal condenser 134 and the PTC heater 111. In this mode, the double layer flow mode door 133 is connected to the second plate member 126. That is, the double layer flow mode is activated so that the outside air flows through the upper intake passage 113 and the inside air flows through the lower intake passage 114. According to the airflow directions shown by the arrows in FIG. 6, the airflow flows through the center portion of the internal evaporator 109, and the temperature and humidity of the airflow are decreased. Then, the airflow exchanges heat with the internal condenser 134, and the temperature of the airflow is increased. Subsequently, the airflow exchanges heat with the PTC heater 111. Thus, the airflow is further heated and the temperature of the airflow is further increased. A small part of the warm air in the upper intake passage 113 blows out from the defrost outlet 118. The warm air blown out from the defrost outlet 118 acts on the front windshield to prevent frost and fog. Most part of the warm air in the lower intake passage 114 blows out from the foot outlet and enters the vehicle compartment for heating.

As described above, the split type vehicle air conditioning device according to the present embodiment has double layer flow function for absorbing inside air and outside air. This is because, in the winter, the temperature and the humidity in the vehicle compartment are high, and temperature and the humidity of outside air are low. To avoid fogging on the front windshield, it is necessary to increase a surface temperature of the windshield under low humidity condition, thereby increasing a dew point temperature of the glass. Therefore, it is necessary to control an intake ratio of the inside air to avoid the defrost airflow has excessively high humidity. The intake ratio of inside air is set to be equal to or lower than 20% in an ordinary vehicle air conditioning device. When the intake ratio of the inside air is excessively low, an energy consumption of the vehicle air conditioning device is increased. In order to increase the intake ratio of the inside air and reduce the energy consumption of the air-conditioning box, since the split type vehicle air conditioning device according to the present embodiment has the double layer flow function of inside air and the outside air, the intake ratio of the inside air can be increased to 50%. Specifically, an inner space of the housing of the air conditioning device is divided into two parts, which are not interconnected, by the plate members 124, 125, 126 and the double layer flow mode door 133. The outside air is sucked from the upper intake passage 113 and enters the upper area of the housing. After heated by the PTC heater 111, the air is directly blown out from the defrost outlet 118 for defrosting and defogging. The inside air is sucked from the lower intake passage 114 and enters the lower area of the housing, and finally is blown out to the vehicle compartment for heating. Since the upper inner area and the lower inner area of the housing are not connected with one another, an appropriate increase of the intake ratio of inside air will not affect the defrosting and defogging effect in the vehicle compartment.

The following will describe face and foot blowing mode (mixing mode). FIG. 7 is a diagram showing an internal airflow in the mixing mode in the split type vehicle air conditioning device according to the present embodiment. In the mixing mode, the face door 120, the foot door 121, and the rear exhaust door 122 are partially opened, and the defrost door 117 is completely closed. Driven by the blower 108, the airflow sucked from the outside air inlet 129 and the inside air inlet 128 flow into the housing of the air conditioning device through the upper intake passage 113 and the lower intake passage 114, respectively. Then, the airflows flow through the internal evaporator 109 for heat exchange. After the heat exchange, the temperature and humidity of the airflows are decreased. The upper mixing door 116 and the lower mixing door 115 rotate to the center positions as shown in FIG. 7. According to the directions of the airflows shown by the arrows in FIG. 7, a part of the cold air is heated by flowing through the internal condenser 134 and the PTC heater 111. Then, the heated air is mixed with the unheated cold air flowing through the upper portion of the internal evaporator 109 in an upstream area of the face door 120, and then the mixed air is blown out from the face outlet 119 toward the vehicle compartment. The heated air is also mixed with the unheated cold air flowing through the lower portion of the internal evaporator 109 in an upstream area of the foot door 121, and then the mixed air is blown out from the foot outlet toward the vehicle compartment. Specifically, in the upper intake passage 113, the air flowing through the upper portion of the internal evaporator 109 mixes with the heated air flowing through the internal condenser 134 and the FTC heater 111 in the upstream area of the face door 120, and then the mixed air is blown out from the face outlet 119, In the lower intake passage 114, the air flowing through the lower portion of the internal evaporator 109 mixes with the heated air flowing through the internal condenser 134 and the FTC heater 111 in the upstream area of the foot door 121, and then the mixed air is blown out from the foot outlet. The mixing mode of face blowing mode and the foot blowing mode is suitable for intermediate seasons, such as spring and autumn to meet seasonal needs.

Figure 10:
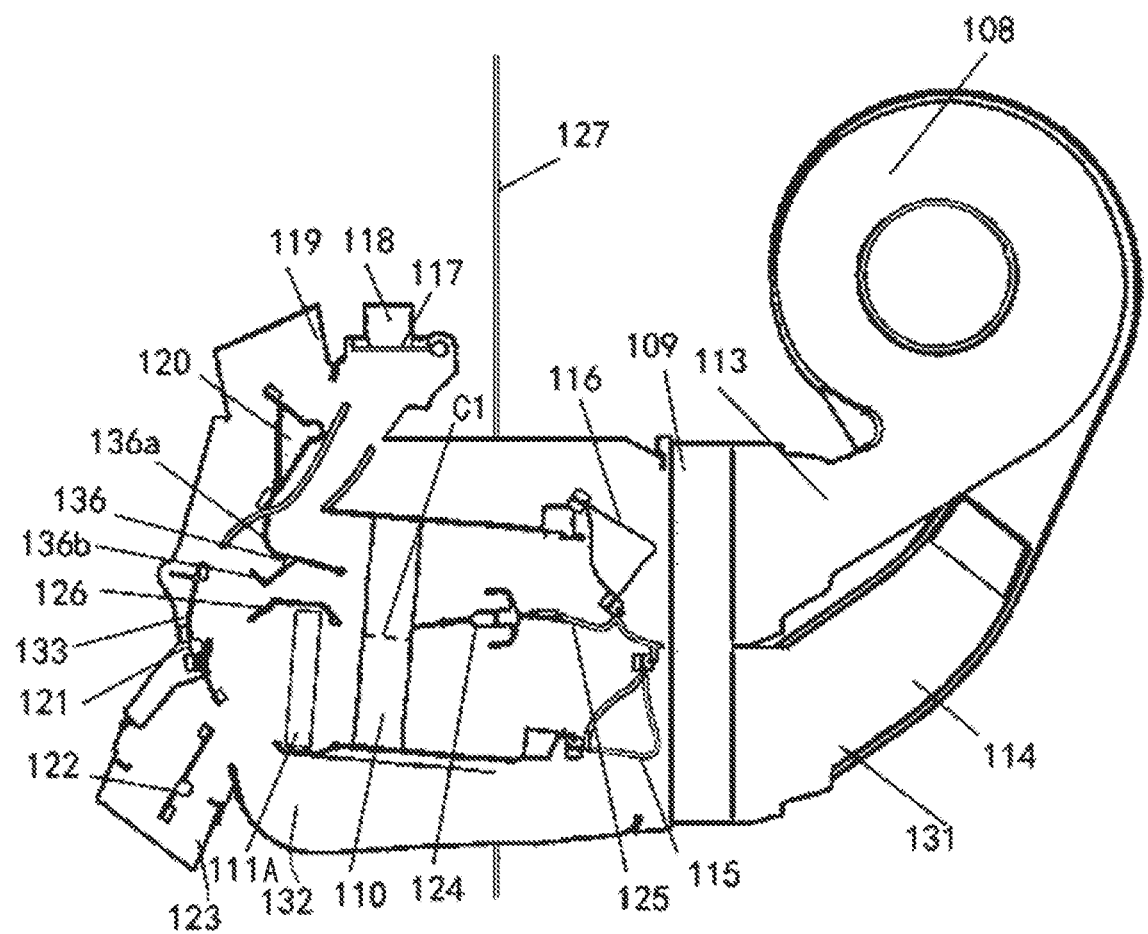
FIG. 10 is a cross-sectional view of the split type vehicle air conditioning device according to the second embodiment of the present disclosure along line A of FIG. 1.
Figure 11:
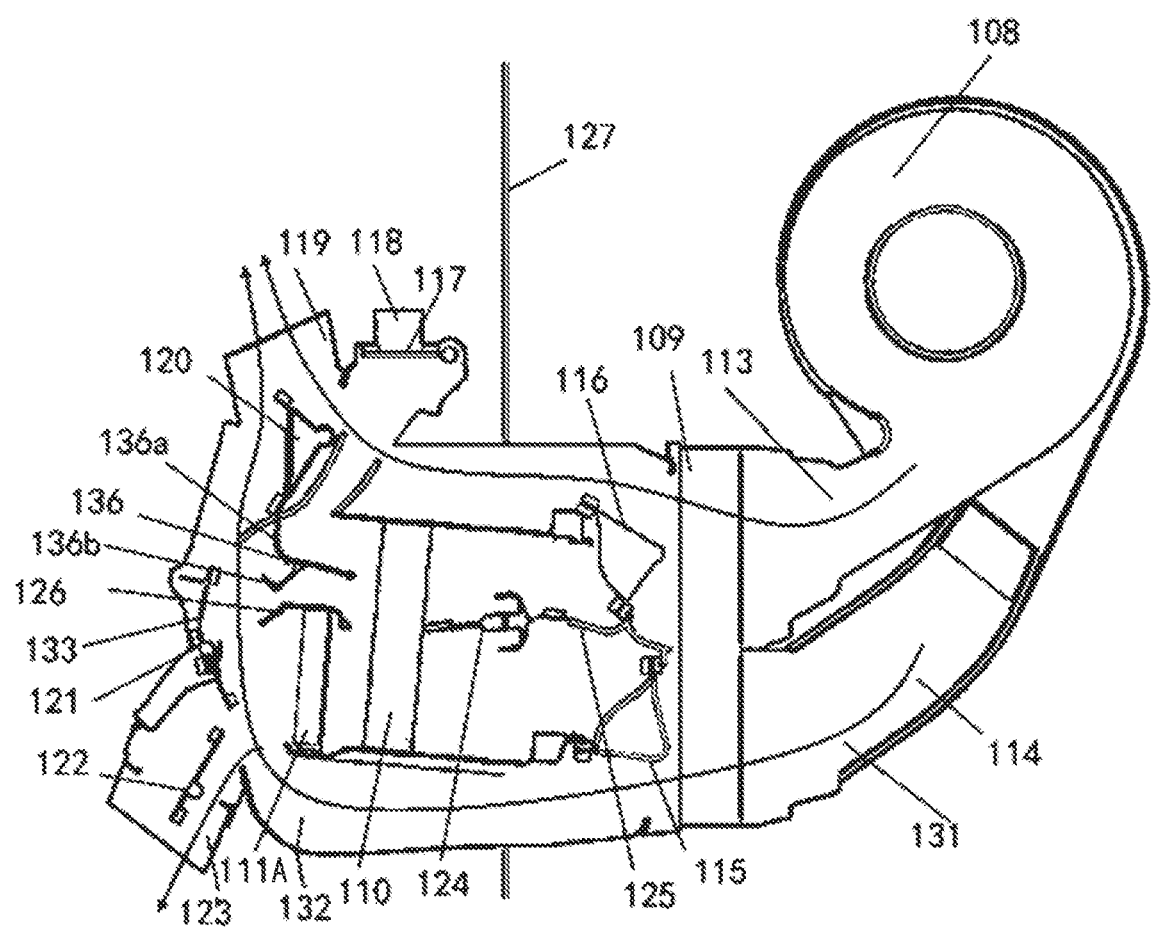
FIG. 11 is a diagram showing an internal airflow in a face blowing mode in the split type vehicle air conditioning device according to the second embodiment.
Figure 12:
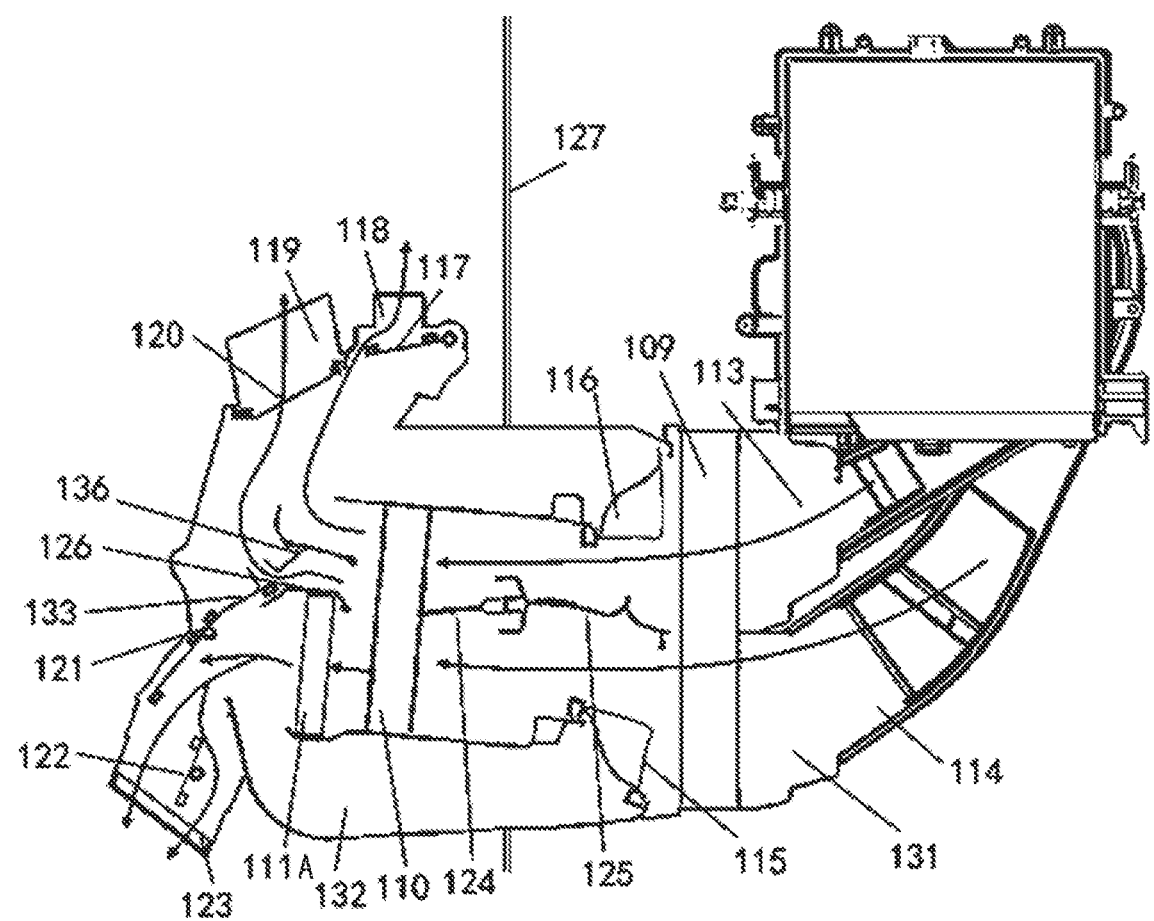
FIG. 12 is a diagram showing an internal airflow in a foot blowing mode in the split type vehicle air conditioning device according to the second embodiment.
Figure 13:
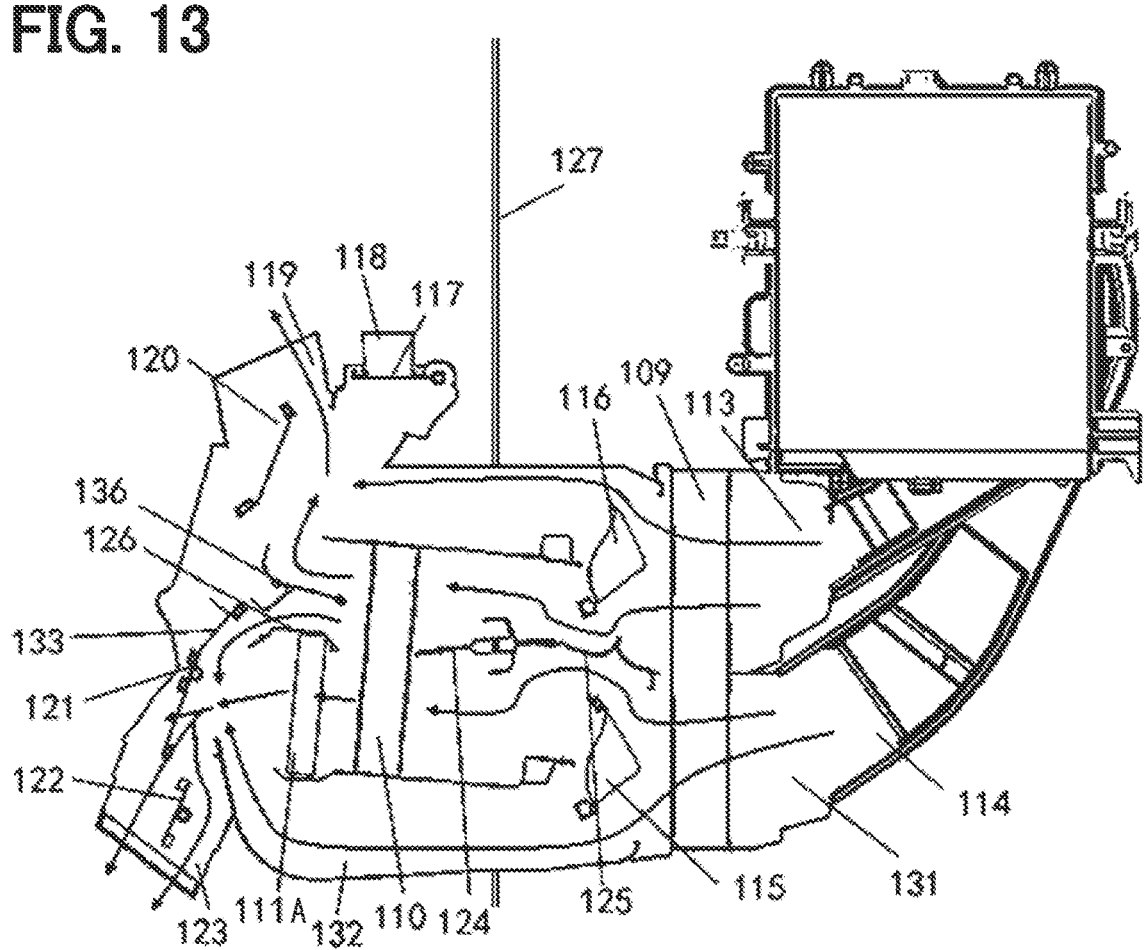
FIG. 13 is a diagram showing an internal airflow in a mixing mode in the split type vehicle air conditioning device according to the second embodiment.

The following will describe the split type vehicle air conditioning device according to the second embodiment. FIG. 10 shows a cross-sectional view of the split type vehicle air conditioning device according to the second embodiment of the present disclosure taken along a line A-A of FIG. 1. FIG. 11 to FIG. 13 are diagrams showing internal airflows in different modes in the split type vehicle air conditioning device according to the second embodiment. The split type vehicle air conditioning device of the present embodiment can be applied to a fuel engine vehicle or an electric vehicle which usually adopt water-to-air (ATM, that is, heated coolant-to-air heat exchange as the heat exchange method.

The second embodiment adopts a split structure as in the first embodiment, and the same or equal components as those in the first embodiment are noted by the same reference numerals and description thereof will not be repeated. The following mainly describes the difference of the second embodiment from the first embodiment in detail.

As shown in FIG. 10, the difference of the present embodiment from the first embodiment is mainly in the following aspects. The heat exchanger is provided by a heater core 110, the internal evaporator 109 and the blower 108 are disposed in the rear housing 131 without the internal condenser. The condenser is disposed outside of the housing together with the compressor. In the portion of the lower intake passage 114 which is disposed in the front housing 132, an auxiliary heater is provided in a downstream area of the heater core 110. For example, the auxiliary heater may be provided by an auxiliary PTC heater 111A. The auxiliary heater is mainly used to rapidly heat the vehicle compartment immediately after the vehicle is started since the temperature of the coolant needs a certain period to rise right after the vehicle is started. The auxiliary FTC heater 111, may be provided by a low voltage FTC heater.

In the present embodiment, coolant flows through the heater core 110 for heat exchange, a coolant inlet pipe of the heater core 110 is connected to a coolant outlet of the engine coolant tank, and the coolant after cooling the engine enters the heater core 110. The coolant in the heater core 110 exchanges heat with the airflow which flows through the heater core 110 at a high speed. The coolant in the heater core 110 exits from the coolant outlet pipe of the heater core 110 back to the engine coolant tank. With this process, the airflow flowing through the heater core 110 is heated to achieve the heating effect, Similar to the first embodiment, in the present embodiment; the vertical centerline of the heater core 110 is inclined at a certain angle with respect to the firewall 127. In addition, the heater core 110 is also arranged with its horizontal centerline C1 located below the first plate member 125.

The split type vehicle air conditioning device according to the present embodiment can also expand the space in the vehicle compartment and improve the riding comfortableness of the occupants in the vehicle compartment. The heater core is installed in the vehicle compartment. During the heating process, the air exchanges heat with the heated coolant which is heated after cooling the engine. This configuration can make effective use of the waste heat generated in the vehicle and save energy. The components which may generate noise, such as the blower are placed in the engine room. Thus, the noise in the vehicle compartment can be significantly reduced.

As shown in FIG. 10, the respective structures and functions of the plate members 124, 125, and 126 in the present embodiment are similar to those in the first embodiment. In the present embodiment, the first plate member 125 and the third plate member 124 are sequentially arranged between the internal evaporator 109 and the heater core 110. The second plate member 126 is arranged on downstream side of the heater core 110.

The volume of airflow flowing through the heater core 110 can be controlled by the plate members 124 and 126 provided inside the split type vehicle air conditioning device. Specifically, in the present embodiment, the plate members 124, 126 are arranged slightly above a center portion of the heater core 110 in the up-and-down direction. The first plate member 125 divides the airflow from the internal evaporator 109 into two airflows. The plate members 124 and 126 guide the two airflows so that cold upper airflow absorbs less heat from the heater core 110 compared with the cold lower airflow. Thus, a temperature of the airflow blown out from the face outlet 119 is lower than a temperature of the airflow blown out from the foot outlet. This configuration enables an area around the head of the user has a lower temperature than an area around the feet of the user. Thus, the user experience and riding comfortableness can be improved.

The upper mixing door 116 and the lower mixing door 115 are provided in the upper intake passage 113 and the lower intake passage 114, respectively, on the downstream side of the internal evaporator 109. The upper mixing door 116 and the lower mixing door 115 are configured to control the airflow to flow through the heater core 110, or block the airflow so that the airflow does not flow through the heater core 110.

For example, as shown in FIG. 10 and FIG. 11, the airflow entering the housing of the air conditioning device driven by the blower 108 exchanges heat with the internal evaporator 109, and the temperature and humidity of the airflow are decreased. The upper mixing door 116 and the lower mixing door 115 block the airflow from flowing toward the heater core 110, The airflow flows through the upper and lower portions of the internal evaporator 109, and then blown out from the face outlet 119 and the rear exhaust outlet 123 thereby entering the vehicle compartment.

The following will describe the airflow in the housing of the split type vehicle air conditioning device according to the present embodiment in the face blowing mode, in the foot blowing mode, and in the mixing mode of the face blowing mode and foot blowing mode with reference to FIG. 11 to FIG. 13.

The following will describe face blowing mode (cooling mode in summer). FIG. 11 is a diagram showing an internal airflow in the face blowing mode in the split type vehicle air conditioning device according to the present embodiment. In the face blowing mode, the face door 120 and the rear exhaust door 122 are completely opened, and the defrost door 117 and the foot door 121 are closed. Driven by the blower 108, the airflow sucked by the inside air inlet 128 flows into the housing of air conditioning device through the upper intake passage 113 and the lower intake passage 114, and flows through the internal evaporator 109 for heat exchange. After the heat exchange, the temperature and humidity of the airflow are decreased. The upper mixing door 116 and the lower mixing door 115 rotate to the predetermined positions as shown in FIG. 11 to prevent airflow from flowing toward the heater core 110. In this mode, the double layer flow mode door 133 is not connected to the second plate member 126. According to the airflow directions indicated by the arrows shown in FIG. 11, the airflow can only flow through the upper and lower portions of the internal evaporator 109, and the cold air is blown out from the face outlet 119 and the rear exhaust outlet 123 into the vehicle compartment for cooling. Specifically, the airflow flowing through the upper portion of the internal evaporator 109 is blown out from the face outlet 119. A part of the airflow flowing through the lower portion of the internal evaporator 109 is blown out from the rear exhaust outlet 123, Another prat of the airflow flowing through the lower portion of the internal evaporator 109 flows through a passage between the double layer flow mode door 133 and the second plate member 126, and is blown out from the face outlet 119.

The following will describe foot blowing mode (heating mode in winter). FIG. 12 is a diagram showing an internal airflow in the foot blowing mode in the split type vehicle air conditioning device according to the present embodiment. In the foot blowing mode, the foot door 121 is completely opened, the defrost door 117 is partially opened, and the face door 120 and the rear exhaust door 122 are closed. Driven by the blower 108, the airflows sucked by the outside air inlet 129 and the inside air inlet 128 flow into the housing of air conditioning device through the upper intake passage 113 and the lower intake passage 114, respectively. The upper mixing door 116 and the lower mixing door 115 rotate to the predetermined positions as shown in FIG. 12 to open the air passage from the internal evaporator 109 to the heater core 110. In this mode, the double layer flow mode door 133 is connected to the second plate member 126. That is, the double layer flow mode is activated so that the outside air flows through the upper intake passage 113 and the inside air flows through the lower intake passage 114. According to the airflow directions shown by the arrows in FIG. 12, the airflow flows through the center portion of the internal evaporator 109, and the temperature and humidity of the airflow are decreased. Then, the airflow exchanges heat with the coolant flowing inside the heater core 110, and the temperature of the airflow is increased. A small part of the warm air in the upper intake passage 113 blows out from the defrost outlet 118. The warm air blown out from the defrost outlet 118 acts on the front windshield to prevent frost and fog. Most part of the warm air in the lower intake passage 114 flows through the auxiliary PTC heater 111A to be further heated, and then blows out from the foot outlet and enters the vehicle compartment for heating.

The following will describe face and foot blowing mode (mixing mode). FIG. 13 is a diagram showing an internal airflow in the mixing mode in the split type vehicle air conditioning device according to the present embodiment. In the mixing mode, the face door 120, the foot door 121, and the rear exhaust door 122 are partially opened, and the defrost door 117 is completely closed. Driven by the blower 108, the airflow sucked from the outside air inlet 129 and the inside air inlet 128 flow into the housing of the air conditioning device through the upper intake passage 113 and the lower intake passage 114, respectively. Then, the airflows flow through the internal evaporator 109 for heat exchange. After the heat exchange, the temperature and humidity of the airflows are decreased. The upper mixing door 116 and the lower mixing door 115 rotate to the center positions as shown in FIG. 13. In this mode, the double layer flow mode door 133 is connected to the second plate member 126. That is, the double layer flow mode is activated so that the outside air flows through the upper intake passage 113 and the inside air flows through the lower intake passage 114. According to the directions of the airflows shown by the arrows in FIG. 13, a part of the cold air is heated by flowing through the heater core 110. Then, the heated air is mixed with the cold air that is not heated by the heater core 110 and flows through the upper portion of the internal evaporator 109 in an upstream area of the face door 120, and then the mixed air is blown out from the face outlet 119 toward the vehicle compartment. The heated air is also mixed with the cold air that is not heated by the heater core 110 and flows through the lower portion of the internal evaporator 109 in an upstream area of the foot door 121, and then the mixed air is blown out from the foot outlet toward the vehicle compartment. Specifically, in the upper intake passage 113, the air flowing through the upper portion of the internal evaporator 109 mixes with the heated air flowing through the heater core 110 in the upstream area of the face door 120, and then the mixed air is blown out from the face outlet 119. In the lower intake passage 114, the air flowing through the lower portion of the internal evaporator 109 mixes with the heated air flowing through the heater core 110 and the auxiliary PTC heater 111A in the upstream area of the foot door 121, and then the mixed air is blown out from the foot outlet. The mixing mode of face blowing mode and the foot blowing mode is suitable for intermediate seasons, such as spring and autumn to meet seasonal needs.

Figure 14:
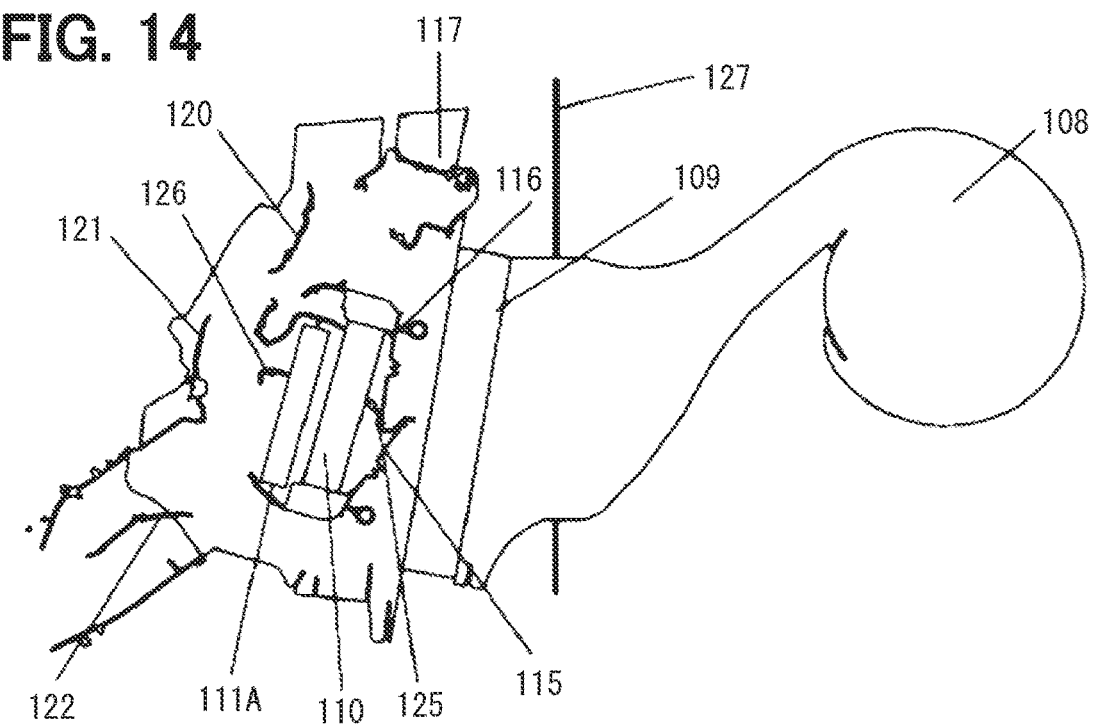
FIG. 14 is a cross-sectional view of the split type vehicle air conditioning device according to a third embodiment of the present disclosure.
Figure 15:
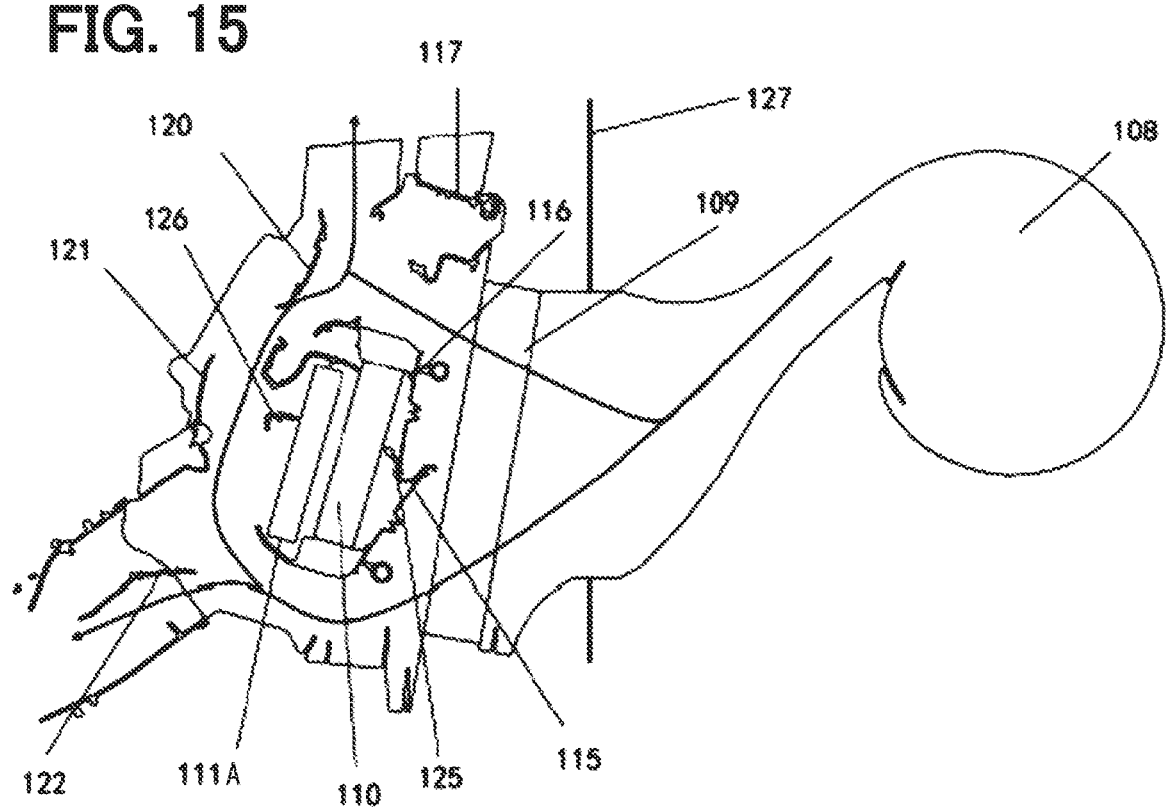
FIG. 15 is a diagram showing an internal airflow in a face blowing mode in the split type vehicle air conditioning device according to the third embodiment.
Figure 16:
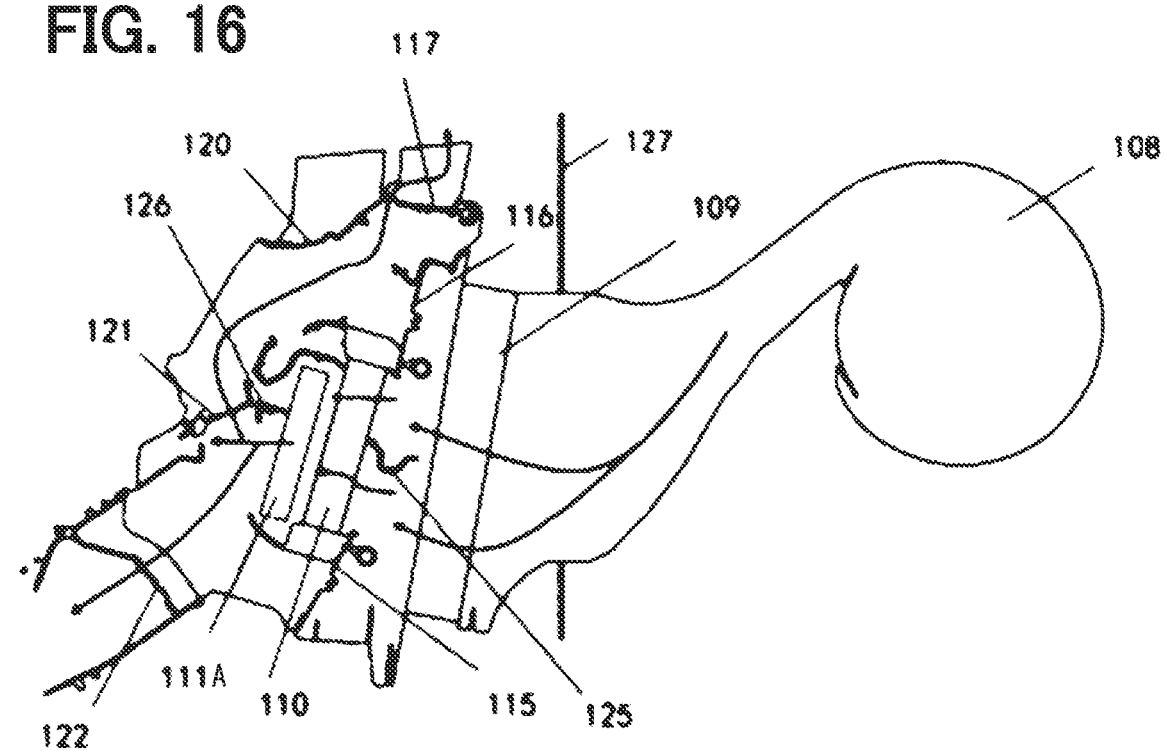
FIG. 16 is a diagram showing an internal airflow in a foot blowing mode in the split type vehicle air conditioning device according to the third embodiment.
Figure 17:
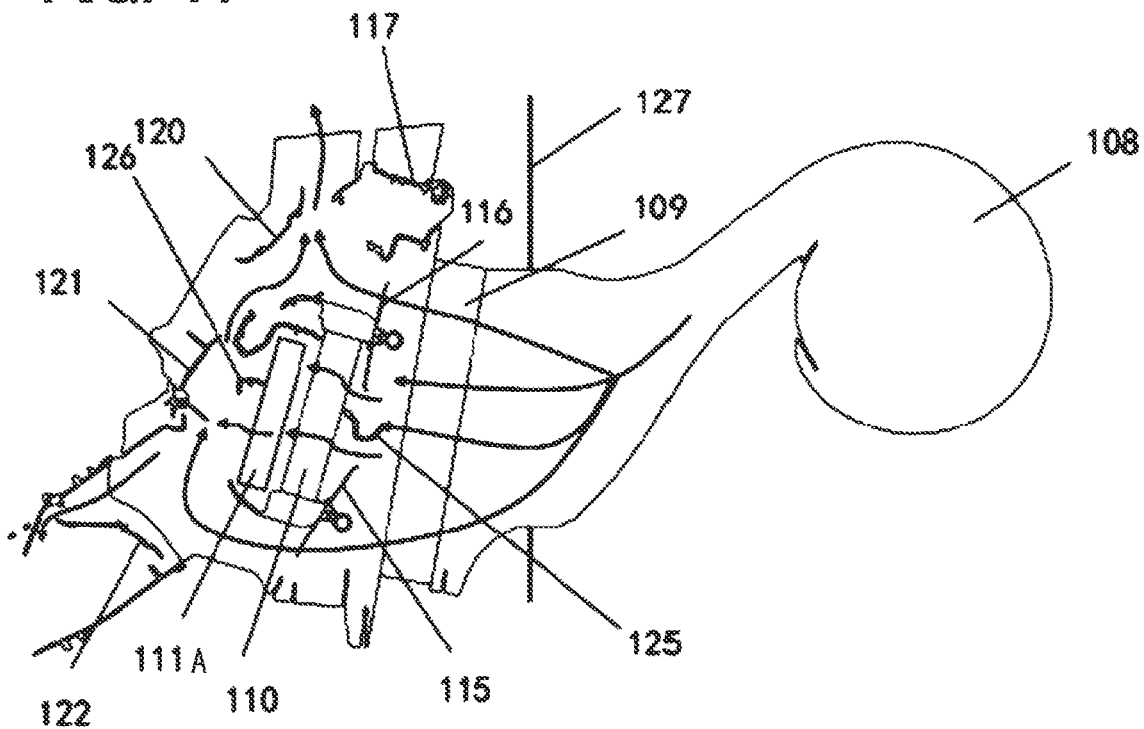
FIG. 17 is a diagram showing an internal airflow in a mixing mode in the split type vehicle air conditioning device according to the third embodiment.

FIG. 14 is a cross-sectional view of the split type vehicle air conditioning device according to the third embodiment of the present disclosure. FIG. 15 to FIG. 17 are diagrams showing internal airflows in different modes in the split type vehicle air conditioning device according to the third embodiment. The split type vehicle air conditioning device of the present embodiment can be applied to a fuel engine vehicle or an electric vehicle which usually adopt water-to-air (ATM, that is, heated coolant-to-air heat exchange as the heat exchange method.

In the present embodiment, the same or equal components as those in the first and second embodiments are noted by the same reference numerals and description thereof will not be repeated. The following mainly describes the difference of the third embodiment from the first or the second embodiment in details.

As shown in FIG. 14, the split type vehicle air conditioning device of the present embodiment can be applied to water-to-air (ATM, that is, heated coolant-to-air heat exchange method similar to the second embodiment. The heat exchanger in the present embodiment is also provided by the heater core 110 and internal condenser is not disposed in the housing similar to the second embodiment. An auxiliary heater, such as an auxiliary FTC heater 111A is disposed on the downstream side of the heater core 110.

The main difference between the present embodiment and the second embodiment is that the blower 108 is a single layer flow mode blower, and the intake passage connected to the blower 108 is not divide into the upper and lower intake passages. In the present embodiment, the internal evaporator 109 and components on downstream side of the internal evaporator 109 are disposed in the front housing. The airflow from the blower 108 entirely passes through the internal evaporator 109. The components on downstream side of the internal evaporator 109 are disposed in the front housing, that is, on downstream side of the firewall 127. Thus, there is no need to provide the third plate member 124 for separating the upper and lower intake passages and for sealing the portion between the front housing and the rear housing. In the present embodiment, the upper mixing door 116 and the lower mixing door 115 may be sliding doors.

Specifically, the split type vehicle air conditioning device according to the present embodiment adopts a single layer flow blower according to actual applications. The air conditioning device does not have the double layer flow function. The internal evaporator 109 and the heater core 110 are placed in the vehicle compartment, and the blower 108 is placed outside of the vehicle compartment. Thus, inner space of the vehicle compartment can be secured and the noise of the blower can be reduced. The following will describe the airflow in the housing of the single layer split type vehicle air conditioning device according to the present embodiment in the face blowing mode, in the foot blowing mode, and in the mixing mode of the face blowing mode and foot blowing mode with reference to FIG. 15 to FIG. 17.

The following will describe face blowing mode (cooling mode in summer). FIG. 15 is a diagram showing an internal airflow in the face blowing mode in the split type vehicle air conditioning device according to the present embodiment. In the face blowing mode, the upper and lower mixing doors 116, 115 slide to the predetermined positions shown in FIG. 15 to block the air from flowing through the heater core 110. In this mode, the face door 120 and the rear exhaust door 122 are opened, and the foot door 121 and the defrost door 117 are closed. Driven by the blower 108, the intake air exchanges heat with the internal evaporator 109, and the temperature and humidity of the airflow are decreased. Then, the air blows out through the face door 120 and the rear exhaust door 122, and enters the vehicle compartment for cooling.

The following will describe foot blowing mode (heating mode in winter). FIG. 16 is a diagram showing an internal airflow in the foot blowing mode in the split type vehicle air conditioning device according to the present embodiment. In the foot blowing mode, the upper and lower mixing doors 116, 115 slide to the predetermined positions shown in FIG. 16 to open the air passage from the internal evaporator 109 to the heater core 110. In this mode, the foot door 121 is completely open, the defrost door 117 is open at a predetermined angle, and the face door 120 and the rear exhaust door 122 are closed. Driven by the blower 108, the intake air exchanges heat with the internal evaporator 109, and the temperature and humidity of the airflow are decreased. Then the airflow exchanges heat with the heater core 110 and the auxiliary PTC heater 111A, and the temperature of the airflow is increased. Then, the heated air blows out through the foot door 121, and enters the vehicle compartment for heating. Immediately after the vehicle is started, the heat provided only by the heater core 110 may be not enough to quickly heat the vehicle compartment, that is, may fail to satisfy the heating demand quickly. Thus, the auxiliary FTC heater 111A needs to be turned on to accelerate the rapid heating. After the air conditioning device operates stably for a period of time, the auxiliary PTC heater 111A can be turned off since the heater core 110 can provide sufficient heat for heating the vehicle compartment.

The following will describe face and foot blowing mode (mixing mode). FIG. 17 is a diagram showing an internal airflow in the mixing mode in the split type vehicle air conditioning device according to the present embodiment. In the mixing mode, the upper and lower mixing doors 116, 115 slide to the predetermined positions shown in FIG. 17, and the face door 120, the foot door 121, and the rear exhaust door 122 are partially opened, and the defrost door 117 is completely closed. Driven by the blower 108, the intake air exchanges heat with the internal evaporator 109, and the temperature and humidity of the airflow are decreased. A part of the cold air flowing through the upper portion of the internal evaporator 109 mixes with a small part of the heated warm air lowing through the heater core 110 in an area close to the face door 120, and then the mixed air blows out through the face door 120 and enters the vehicle compartment. Another part of the heated warm air flowing through the heater core 110 mixes with the cold air flowing through the lower portion of the internal evaporator 109 in an area close to the foot door 121 and the mixed air blows out through the foot door 121 and the rear exhaust door 122 to enter the vehicle compartment.

Figure 18:
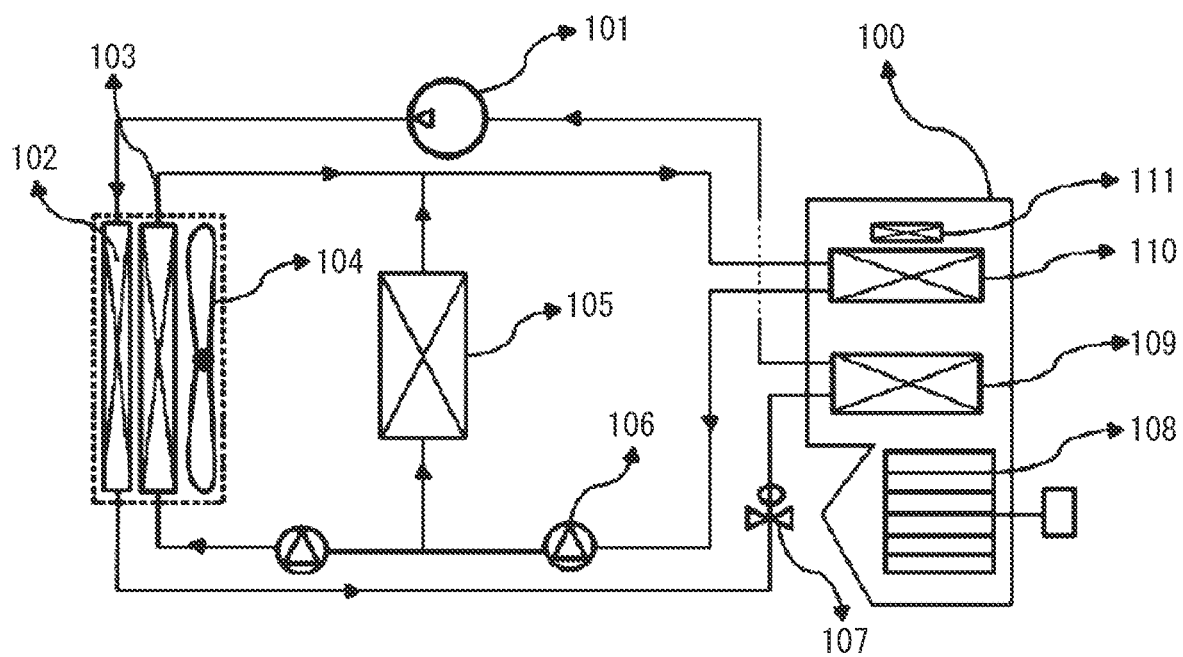
FIG. 18 is a diagram showing an air conditioning system of a fuel vehicle and a hybrid vehicle to which the second embodiment is applied.
Figure 19:
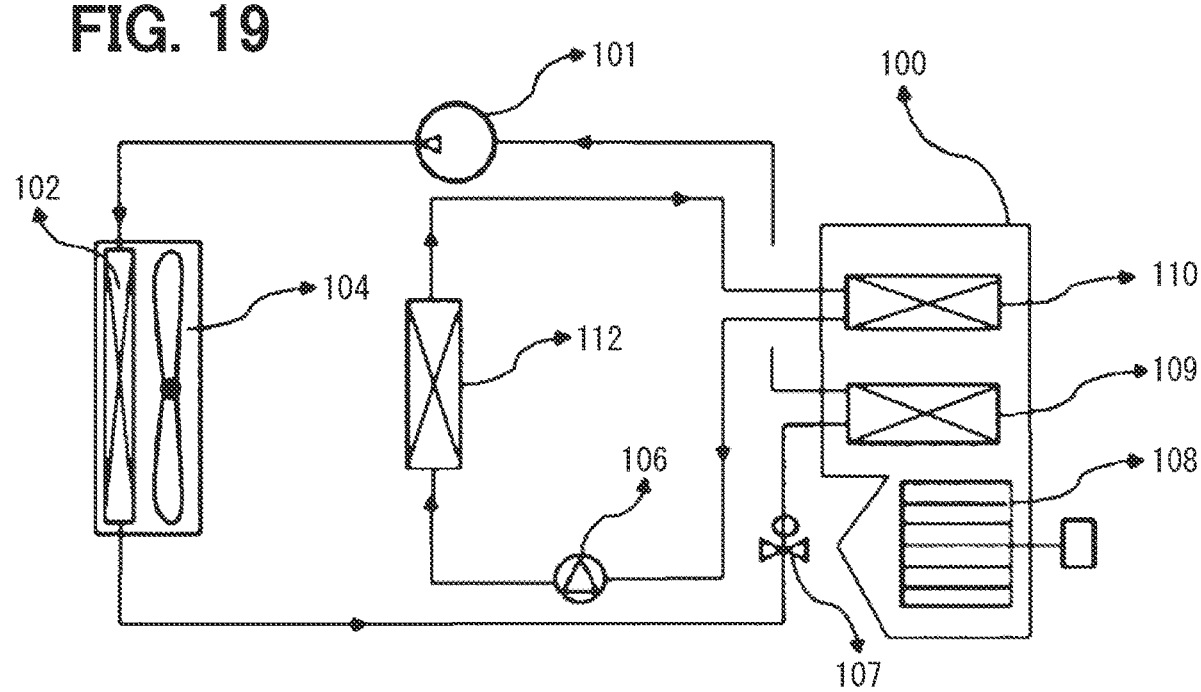
FIG. 19 is a diagram showing an air conditioning system of an electric vehicle to which the second embodiment is applied.

The split type vehicle air conditioning device according to the present disclosure can be applied to fuel engine vehicles and hybrid vehicles as well as electric vehicles. FIG. 18 is a diagram showing the air conditioning system of the fuel vehicle and the hybrid vehicle to which the split type vehicle air conditioning device according to the present disclosure is applied. FIG. 19 is a diagram showing the air conditioning system of the electric vehicle to which the split type vehicle air conditioning device according to the present disclosure is applied.

In FIG. 18, the right part shows internal structure of the housing of the air conditioning device. The heating cycle in the vehicle compartment is realized by the following method. The temperature of coolant in the coolant pathway of the vehicle is increased after cooling the engine 105, and the coolant is sent to the heater core 110 disposed in the housing 100 of the air conditioning device. The inside air of the housing 100 exchanges heat with the heated coolant in the heater core 110, and the temperature of the air is increased. Then, the heated air is blown toward the vehicle compartment for heating. Immediately after the vehicle is started, a temperature increase of the coolant requires a certain period of time. In order to provide rapid heating, a low power PTC heater 111 can be provided on downstream side of the heater core 110. After the temperature of the coolant increases, the PTC heater 111 can be turned off. In the above heating process, the heater core 110 makes full use of the waste heat generated in the coolant pathway of the vehicle and has energy saving effect.

The following will describe a refrigeration cycle in the air conditioning device. The compressor 101 sucks low temperature and low pressure refrigerant gas from the internal evaporator 109, compresses the refrigerant, and discharges high temperature high pressure refrigerant gas into the outside condenser 102 to be condensed into refrigerant liquid. Then, the refrigerant flows through the expansion valve 107. After throttled by the expansion valve 107, the refrigerant gas enters the internal evaporator 109 to evaporate and absorb heat, Since the environment heat is absorbed by the evaporation, airflow inside the housing 100 of the air conditioning device is cooled, and finally sent toward the vehicle compartment for cooling.

In FIG. 19, the right part shows internal structure of the housing of the air conditioning device. The following will describe a heating cycle in the air conditioning device. In a coolant circuit, a FTC heater 112 is provided downstream of a coolant pump 106, and the coolant heated to a certain temperature is sent to the heater core 110 disposed inside of the housing 100 of the air conditioning device. The air inside the housing 100 of the air conditioning device is heated by the heater core 110, and then sent into the vehicle compartment for heating. Although the split type vehicle air conditioning device according to the present embodiment does not use the waste heat generated in a pure electric vehicle, it can be applied to the housing of the air conditioning device equipped to a traditional fuel combustion engine vehicle. Currently, manufacturing platforms for changing fuel engine vehicle to electric vehicle is in practical use, and the split type vehicle air conditioning device according to the present disclosure will reduce platform design cost and reduce manufacturing cost. The refrigeration cycle of the air conditioning device in FIG. 19 is similar to that in FIG. 18, so detailed description is omitted.

The present disclosure can be implemented in various manners without departing from the spirit of the present disclosure. The embodiments of the present disclosure are described for showing exemplary implementations, and the present disclosure are not restricted to the described embodiments.

What claimed is:

1. A vehicle air conditioning device having a split housing structure, the vehicle air conditioning device comprising:
   a front housing disposed in a compartment of a vehicle;
   a heat exchanger disposed in the front housing and heating an airflow flowing through the heat exchanger;
   a rear housing disposed in an engine room or a motor room of the vehicle;
   a firewall, the front housing is connected with the rear housing through an opening defined in the firewall;
   an inlet;
   a blower disposed in the rear housing and configured to suck air;
   an evaporator configured to cool air, an airflow supplied from the blower entirely flowing through the evaporator;
   upper and lower mixing doors disposed in an up-and-down direction downstream of the evaporator;
   a first plate member disposed between the upper and lower mixing doors;
   a second plate member disposed downstream of the heat exchanger;
   an upper outlet; and
   a lower outlet,
   wherein:
   the inlet, the blower, the evaporator, the upper and lower mixing doors, the heat exchanger, and the upper and lower outlets are sequentially arranged from upstream to downstream along the airflow direction in the vehicle air conditioning device;
   the first plate member divides the airflow from the evaporator into an upper airflow and a lower airflow;
   the upper mixing door guides and controls the upper airflow to selectively flow through the heat exchanger;

the lower mixing door guides and controls the lower airflow to selectively flow through the heat exchanger; and the second plate member guides the airflow downstream of the heat exchanger toward at least one of the upper outlet or the lower outlet.

2. The vehicle air conditioning device according to claim 1, further comprising
a third plate member disposed between (i) the upper and lower mixing doors and (ii) the heat exchanger, wherein:
the third plate member is configured to seal a portion between the front housing and the rear housing;
the third plate member, together with the first plate member and the second plate member, divides the airflow from the evaporator into the upper airflow and the lower airflow; and
the evaporator is disposed in the rear housing.

3. The vehicle air conditioning device according to claim 2, further comprising
an internal condenser disposed in the rear housing and configured to generate heat, wherein:
the heat exchanger is provided with a positive temperature coefficient heater; and
the internal condenser is disposed between the first plate member and the third plate member downstream of the upper and lower mixing doors.

4. The vehicle air conditioning device according to claim 2, wherein
the heat exchanger is provided with a heater core in which coolant flows to exchange heat with air.

5. The vehicle air conditioning device according to claim 4, further comprising
an auxiliary positive temperature coefficient heater disposed downstream of the heater core.

6. The vehicle air conditioning device according to claim 1, wherein:
the evaporator is disposed in the front housing; and
the heat exchanger is provided with a heater core in which coolant flows to exchange heat with air.

7. The vehicle air conditioning device according to claim 6, further comprising
an auxiliary positive temperature coefficient heater disposed downstream of the heater core.

8. The vehicle air conditioning device according to claim 1, further comprising
a double layer flow mode door disposed in the front housing; and
a foot door disposed in the front housing,
wherein the double layer flow mode door and the foot door are driven by a single door shaft to rotate synchronously around the door shaft.

9. The vehicle air conditioning device according to claim 1, wherein
a center line of the heat exchanger in a horizontal direction is disposed below the first plate member.

10. The vehicle air conditioning device according to claim 1, wherein
the volume of airflow flowing through an upper portion of the evaporator is set to be larger than the volume of airflow flowing through a lower portion of the evaporator.

* * * * *